(12) United States Patent
Ren et al.

(10) Patent No.: US 8,989,376 B2
(45) Date of Patent: Mar. 24, 2015

(54) METHOD AND APPARATUS FOR AUTHENTICATING VIDEO CONTENT

(75) Inventors: Yansong Ren, Plano, TX (US); Lawrence O'Gorman, Madison, NJ (US); John R. Zhang, Calgary (CA); Thomas L. Wood, Colts Neck, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 243 days.

(21) Appl. No.: 13/434,399

(22) Filed: Mar. 29, 2012

(65) Prior Publication Data

US 2013/0259228 A1    Oct. 3, 2013

(51) Int. Cl.
*H04N 7/167* (2011.01)
*H04L 29/06* (2006.01)
*H04L 9/32* (2006.01)
*H04L 9/06* (2006.01)
*H04L 9/00* (2006.01)

(52) U.S. Cl.
CPC .............. *H04L 63/12* (2013.01); *H04L 63/123* (2013.01); *H04L 2209/608* (2013.01); *H04L 9/32* (2013.01); *H04L 9/0643* (2013.01); *H04L 9/00* (2013.01); *H04L 2209/603* (2013.01); *H04L 2209/60* (2013.01)
USPC ........... 380/200; 713/160; 713/161; 713/168; 713/176

(58) Field of Classification Search
CPC ........... H04L 9/00; H04L 9/0643; H04L 9/32; H04L 9/3236; H04L 9/3247; H04L 63/12; H04L 63/123; H04L 2209/60; H04L 2209/603; H04L 2209/608
See application file for complete search history.

(56) References Cited

U.S. PATENT DOCUMENTS

| | | | |
|---|---|---|---|
| 5,799,092 A | 8/1998 | Kristol et al. | |
| 6,587,945 B1 * | 7/2003 | Pasieka | 713/176 |
| 8,200,959 B2 * | 6/2012 | Wing et al. | 713/156 |
| 8,385,644 B2 * | 2/2013 | Stojancic | 382/170 |
| 8,689,005 B2 * | 4/2014 | Lentini | 713/186 |
| 2005/0240771 A1 * | 10/2005 | Ginter et al. | 713/176 |
| 2005/0257067 A1 * | 11/2005 | Roberts | 713/186 |
| 2006/0041753 A1 * | 2/2006 | Haitsma | 713/176 |

(Continued)

OTHER PUBLICATIONS

"A Robust Content Based Digital Signature for Image Authentication", Marc Schneider and Shih-Fu Chang, Columbia University, 1996 (IEEE).*

(Continued)

*Primary Examiner* — Jeffrey Pwu
*Assistant Examiner* — Jayesh Jhaveri
(74) *Attorney, Agent, or Firm* — Hitt Gaines, PC

(57) ABSTRACT

A method for authenticating video content includes: receiving a digital signature, an unsecured video fingerprint, and an unsecured video content from a transmitting node at a receiving node in a communication network; determining if the digital signature is consistent with the unsecured video fingerprint at the receiving node to verify the unsecured video fingerprint; and determining if the unsecured video fingerprint is consistent with the unsecured video content at the receiving node to verify the unsecured video content in a manner that tolerates a predetermined measure of loss in the unsecured video content. If the unsecured video fingerprint and the unsecured video content are verified, the unsecured video content is authenticated for subsequent use at the receiving node. A receiving node associated with the method includes an input module, a fingerprint verification module, a content verification module, and a controller module.

21 Claims, 16 Drawing Sheets

(56) References Cited

U.S. PATENT DOCUMENTS

| | | |
|---|---|---|
| 2006/0200672 A1* | 9/2006 | Calhoon et al. ............... 713/176 |
| 2008/0310734 A1 | 12/2008 | Ahammad et al. |
| 2008/0317278 A1* | 12/2008 | Lefebvre et al. ............. 382/100 |
| 2009/0006844 A1* | 1/2009 | Wing et al. ................... 713/156 |
| 2009/0324199 A1* | 12/2009 | Haitsma et al. ................. 386/95 |
| 2011/0200224 A1* | 8/2011 | Kamperman ................. 382/100 |
| 2012/0002884 A1 | 1/2012 | Ren et al. |

OTHER PUBLICATIONS

"A Complexity-Invariant Distance Measure for Time Series", Batista et al., Published 2011 in SIAM International Conference on Data mining, 2011.*

"Geometric distortion-resilient image hashing scheme and its applications on copy detection and authentication", Chun-Shien Lu, Chao-Yong Hsu, Published online: Oct. 17, 2005—Springer-Verlag, Institute of Information Science, Academia Sinica Taipei, Taiwan 115, Republic of China, 2005.*

"H.264/AVC Video Authentication Based Video Content", Ait saadi et al., Algeria, IEEE 2010.*

"A Robust and Fast Video Copy Detection System Using Content-Based Fingerprinting", Esmaeili et al., IEEE Transactions on Information Forensics and Security, vol. 6, No. 1, Mar. 2011.*

"A Noble Reversible Data Embedding Method for Source Authentication and Tamper Detection of H.264/AVC Video", Maiti et al., India, IEEE 2011.*

"Video Fingerprinting and Encryption Principles for Digital Rights Management", Deepa Kundur, Kannan Karthik, Proceedings of the IEEE, vol. 92, No. 6, Jun. 2004.*

Rublee et al., "ORB: an efficient alternative to SIFT or SURF", IEEE International Conference on Computer Vision (ICCV), Nov. 6, 2011, pp. 2564-2571.

PCT App. No. PCT/US2013/031894, International Search Report, mailed May 27, 2013, 3 pp.

Su et al., "Towards Effective Content Authentication for Digital Videos by Employing Feature Extraction and Quantization," IEEE Transactions on Circuits and Systems for Video Technology, vol. 19, No. 5, May 2009, pp. 668-677.

Mukherjee et al., "Recognizing Human Action at a Distance in Video by Key Poses," IEEE Transactions on Circuits and Systems for Video Technology, vol. 21, No. 9, Sep. 2011, pp. 1228-1241.

Weng et al., "From Image Hashing to Video Hashing," Advances in Multimedia Modeling, Springer Berlin Heidelberg, Jan. 6, 2010, pp. 662-668.

PCT App. No. PCT/US2013/031894, Written Opinion of the International Searching Authority, mailed May 27, 2013, 5 pp.

Cisco Video Surveillance 2500 Series IP Camera, Data Sheet No. C780455613-03, Cisco Systems, Inc., Feb. 2011, 6 Pages.

Rosten et al., Machine Learning for High-Speed Corner Detection, Proceedings of European Conference on Computer Vision, 2006, pp. 430-443.

Lucas et al., An Iterative Image Registration Technique With an Application to Stereo Vision, Proceedings of Darpa Imaging Understanding Workshop, Apr. 1981, pp. 121-130.

Fips Pub 180-3, Secure Hash Standard (SHS), Federal Information Processing Standards Publication, Information Technology Laboratory, National Institute of Standards and Technology, Oct. 2008, 32 Pages.

Rivest et al., A Method for Obtaining Digital Signatures and Public-Key Cryptosystems, Communications of the ACM, vol. 21, No. 2, Feb. 1978, pp. 120-126.

Koblitz, Elliptic Curve Cryptosystems, Mathematics of Computation, vol. 48, No. 177, Jan. 1987, pp. 203-209.

Miller, Use of Elliptic Curves in Cryptography, Advances in Cryptology—Crypto Proceedings: Lecture Notes in Computer Science,1986, pp. 417-426.

Batista et al., A Complexity-Invariant Distance Measure for Time Series, Proceedings of Society of Industrial and Applied Mathematics (SIAM) Conference on Data Mining, Apr. 28-30, 2011, Mesa, Arizona, pp. 699-710.

Keogh et al., An Online Algorithm for Segmenting Time Series, Proceedings of IEEEE International Conference on Data Mining, Nov. 29-Dec. 2, 2001, pp. 289-296.

Chaudhry et al., Histograms of Oriented Optical Flow and Binet-Cauchy Kernals on Nonlinear Dynamical Systems for the Recognition of Human Actions, IEEE Conference on Computer Vision and Pattern Recognition, 2009, pp. 1932-1939.

Lowe, Distinctive Image Features From Scale-Invariant Keypoints, International Journal of Computer Vision, vol. 60, Issue 2, Nov. 2004, pp. 91-110.

Bay et al., Surf: Speeded Up Robust Features, Computer Vision and Image Understanding, vol. 110, Issue 3, Jun. 2008, pp. 346-359.

Pong et al., Visual Event Detection Using Orientation Histograms With Feature Point Trajectory Information, IEEE International Conference on Multimedia and Expo, Jun. 28-Jul. 3, 2009, pp. 342-345.

Dalal et al., Histograms of Oriented Gradients for Human Detection, IEEE Computer Society Conference on Computer Vision and Pattern Recognition, vol. 1, Jun. 25, 2005, pp. 886-893.

* cited by examiner

FIG. 8

| TEAM | PRECISION | QUERY TIME |
|---|---|---|
| ADVESTIGO | 0.86 | 64 min |
| CHINESE ACADEMY OF SCIENCES - 1 | 0.46 | 41 min |
| CHINESE ACADEMY OF SCIENCES - 2 | 0.53 | 14 min |
| CITY UNIVERSITY OF HONG KONG | 0.66 | 45 min |
| IBM - 1 | 0.86 | 44 min |
| IBM - 2 | 0.73 | 68 min |
| IBM - 3 | 0.8 | 99 min |
| OUR APPROACH | 1.0 | <10 min |

FIG. 9

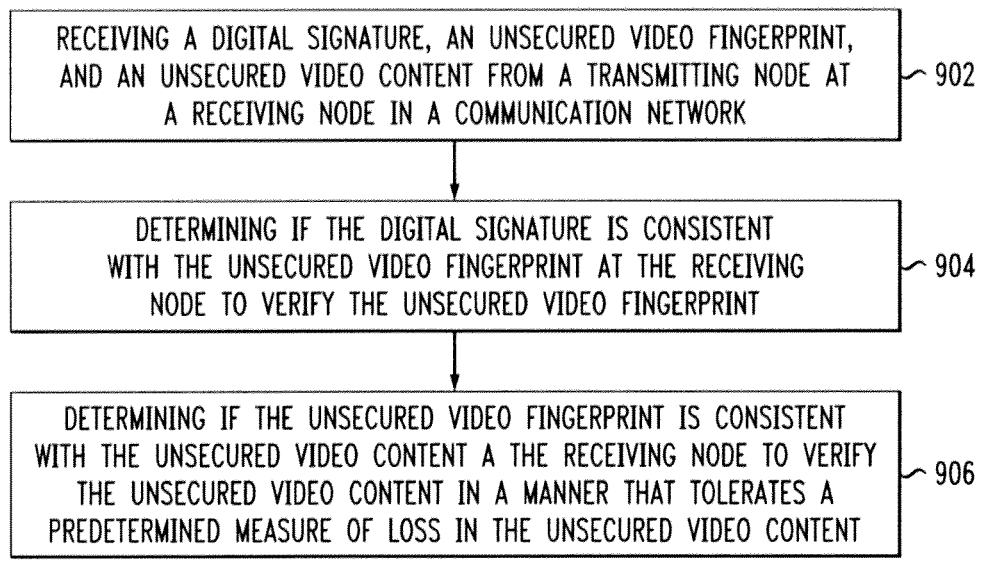

900 →

- 902: RECEIVING A DIGITAL SIGNATURE, AN UNSECURED VIDEO FINGERPRINT, AND AN UNSECURED VIDEO CONTENT FROM A TRANSMITTING NODE AT A RECEIVING NODE IN A COMMUNICATION NETWORK
- 904: DETERMINING IF THE DIGITAL SIGNATURE IS CONSISTENT WITH THE UNSECURED VIDEO FINGERPRINT AT THE RECEIVING NODE TO VERIFY THE UNSECURED VIDEO FINGERPRINT
- 906: DETERMINING IF THE UNSECURED VIDEO FINGERPRINT IS CONSISTENT WITH THE UNSECURED VIDEO CONTENT A THE RECEIVING NODE TO VERIFY THE UNSECURED VIDEO CONTENT IN A MANNER THAT TOLERATES A PREDETERMINED MEASURE OF LOSS IN THE UNSECURED VIDEO CONTENT

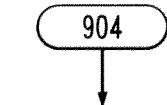

- 1002: DECRYPTING THE DIGITAL SIGNATURE USING A DECRYPTION ALGORITHM AND A PUBLIC KEY AT THE RECEIVING NODE TO OBTAIN A DECRYPTED HASH VALUE RELATING TO THE ORIGINAL HASH VALUE
- 1004: PROCESSING THE UNSECURED VIDEO FINGERPRINT USING THE HASHING ALGORITHM AT THE RECEIVING NODE TO OBTAIN A FRESH HASH VALUE RELATING TO THE ORIGINAL HASH VALUE
- 1006: COMPARING THE FRESH HASH VALUE TO THE DECRYPTED HASH VALUE AT THE RECEIVING NODE SUCH THAT THE UNSECURED VIDEO FINGERPRINT IS VERIFIED IF THE FRESH HASH VALUE MATCHES THE DECRYPTED HASH VALUE

906

METHOD AND APPARATUS FOR AUTHENTICATING VIDEO CONTENT

BACKGROUND

This disclosure relates to a method and apparatus for authenticating video content that may be intentionally altered during transmission in order to accommodate a variety of access devices, network architectures, and communication protocols. In various embodiments, a transmitting node, a receiving node, or both implement such a process. Various embodiments of the process use video fingerprints and cryptographic digital signatures of video content to authenticate the video content by separately verifying the corresponding video fingerprint and video content. The various embodiments of the process for authenticating video content disclosed herein tolerate a predetermined measure of loss in the video content at the receiving node. For example, the methods and apparatus described herein permits wide access of real time video from mobile and fixed cameras to government safety organizations, military organizations, news organizations, and the general public.

Public surveillance cameras are installed for the purpose of security and safety in such diverse places as roads, city sidewalks, airports, subways, military bases, schools, and stores. As recently as ten years ago, these video feeds were private, only viewable by a single entity such as the police, military, or private security company. However, it is increasingly common that public surveillance video is sent in the clear to enable use by multiple security entities (e.g., police, fire, ambulance, homeland security, etc.) and to enable public access for various uses (e.g., for crowd-sourcing the security task, obtaining information on traffic congestion, etc.). In-the-clear video content is not encrypted to enable open access or at least wider access than would be practical for encryption. Thus, there is a need for content authentication to defend against malicious attacks that include source data modification and man-in-the-middle modification. For example, an attacker may intercept video streams and may remove incriminating evidence by reordering frames or injecting new ones of pre-recorded video. Authentication ensures that video content received at a receiver (i.e., recipient) end (e.g., security control station) is the same as the original video content captured at a video camera or supplied by another source at the sender end. For example, this is pertinent to the security of LTE mobile video which could be used for public safety and first responder communications.

There are a number of solutions to video content authentication. Generally speaking, they can be classified into three categories: 1) symmetric encryption, 2) digital signatures using asymmetric encryption, and 3) watermarking. However, none of these existing solutions are sufficient for the needs today to authenticate video content across a wide range of recipients where a wide range of devices are used on both the source and receiver (i.e., recipient) ends of video communications.

Symmetric encryption is not sufficient because it requires that many different security agencies have to distribute and share a single decryption key. In security, this is known as the key management problem. Distributing too many keys inevitably reduces system security. More specifically, symmetric encryption includes fully layered encryption and selective or permutation-based encryption. In fully layered encryption, video content is compressed and then encrypted. This approach usually results in heavy computation and slow speed, which makes it unsuitable for real-time video authentication. Selective and permutation-based encryption selectively encrypts bytes or uses permutation to scramble video content. This type of approach is typically designed for specific video formats, such as H.264 or MPEG. For instance, in MPEG, symmetric encryption is used to select and permute bytes based on relationships among I-frames, P-frames, and B-frames. In general, this approach is not format compliant.

Digital signatures that use asymmetric encryption are commonly used cryptographic methods that are very secure for authenticating data. However, due to the nature of cryptographic calculations, this requires that the received data be identical to the source data; otherwise it will not authenticate. The problem with video transmission—especially over wireless channels—is that the original content may be altered due to noise in the channel or to resize the video due to device capabilities (e.g., to the smaller screen of a mobile device). Therefore, even though the data may not be maliciously altered, the received data may not be exactly the same as the original—in which case it will erroneously not authenticate (i.e., false rejection).

Asymmetric encryption and digital signatures can be obtained by applying Haar wavelet filters, discrete cosine transforms (DCTs), or wavelet transforms on frames and then generating hash values based on the obtained parameters. An example of an off-the-shelf camera that implements cryptographic security is the Cisco Video Surveillance 2500 Series IP Camera from Cisco Systems, Inc. of San Jose, Calif. This includes hardware-based asymmetric encryption using advanced encryption standard (AES).

A variant of the asymmetric encryption and digital signatures solution is based on a cryptographic checksum, which provides a digitally signed checksum of whole frames, periodic frames, packets, or periodic packets. The cryptographic checksum solution provides modification detection and message integrity checking. It is able to handle the case of video packet loss during transmission. However, for the cases that the video is purposefully altered, for example, for size-reduction or transcoding in the case of a 4G mobile or for HTTP adaptive bitrate streaming, the crypto-checksum will not match an altered video unless the checksum is reapplied at each modifying node. This is possible in a proprietary network, however this is non-standard and would entail fairly complex—and potentially insecure—key management to distribute and securely maintain the encryption key(s) at all the nodes.

Watermarking can avoid the problems with symmetric and asymmetric encryption and thus is a valid solution to the current problem. However, watermarking has its own disadvantages. Since a watermark is embedded into the original video, it necessarily alters that video. The tradeoff for watermarks is imperceptibility of the embedded watermark versus the ability to extract the watermark from the video to perform authentication. In the current problem, it is undesirable to alter the video and desirable to maximize the success of authentication. Under these circumstances, it is undesirable to embed a watermark in the video. Digital watermarking embeds information into video frames to verify authenticity. Watermarking techniques exist for both uncompressed and compressed video (e.g., H.264).

Based on the foregoing, it is desirable that a process for authenticating video content allows access to a variety of persons using a variety of user devices across a variety of network architectures and communication protocols while also being able to detect when video content is unexpectedly altered, covertly altered, or altered with deceptive intent. In order to permit such wide access, the process must be able to tolerate video content that has legitimately and expectedly been altered during transmission.

SUMMARY

In one aspect, a method for authenticating video content is provided. In one embodiment, the method includes: receiving a digital signature, an unsecured video fingerprint, and an unsecured video content from a transmitting node at a receiving node in a communication network; determining if the digital signature is consistent with the unsecured video fingerprint at the receiving node to verify the unsecured video fingerprint; and determining if the unsecured video fingerprint is consistent with the unsecured video content at the receiving node to verify the unsecured video content in a manner that tolerates a predetermined measure of loss in the unsecured video content. If the unsecured video fingerprint and the unsecured video content are verified, the unsecured video content is authenticated for subsequent use at the receiving node.

In another aspect, an apparatus for authenticating video content is provided. In one embodiment, the apparatus includes: an input module configured to receive a digital signature, an unsecured video fingerprint, and an unsecured video content from a transmitting node via a communication network; a fingerprint verification module configured to determine if the digital signature is consistent with the unsecured video fingerprint to verify the unsecured video fingerprint; a content verification module configured to determine if the unsecured video fingerprint is consistent with the unsecured video content to verify the unsecured video content in a manner that tolerates a predetermined measure of loss in the unsecured video content; and a controller module in operative communication with the input module, fingerprint verification module, and content verification module and configured to control operations such that, if the unsecured video fingerprint and the unsecured video content are verified, the unsecured video content is authenticated for subsequent use. The unsecured video fingerprint is a received version of an original video fingerprint. The original video fingerprint is derived from an original video content using a fingerprinting algorithm prior to transmission of the original video fingerprint by the transmitting node.

In yet another aspect, a method for authenticating video content is provided. In one embodiment, the method includes: receiving a video content from a source device; generating a video fingerprint by processing the video content using a fingerprinting algorithm; processing the video fingerprint using a hashing algorithm to obtain an original hash value; encrypting the original hash value using an encryption algorithm and a private key to obtain a digital signature relating to the original hash value; at least temporarily storing the digital signature, video fingerprint, and video content in a storage device at a transmitting node; and transmitting the digital signature, video fingerprint, and video content from the transmitting node to a receiving node in a communication network in one or more communication sessions.

In still another aspect, a non-transitory computer-readable medium is provided. In one embodiment, the non-transitory computer-readable medium stores first program instructions that, when executed by a first computer, cause a computer-controlled receiving node associated with a communication network to perform a method for authenticating video content. In one embodiment, the method includes: after receiving a digital signature, an unsecured video fingerprint, and an unsecured video content from a transmitting node at a receiving node in a communication network, determining if the decrypted hash value is consistent with the unsecured video fingerprint at the receiving node to verify the unsecured video fingerprint; and determining if the unsecured video fingerprint is consistent with the unsecured video content at the receiving node to verify the unsecured video content in a manner that tolerates a predetermined measure of loss in the unsecured video content. If the unsecured video fingerprint and the unsecured video content are verified, the unsecured video content is authenticated for subsequent use at the receiving node.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 8 is a table showing results from a quantitative comparison of performance of various fingerprinting algorithms;

FIG. 9 is a flow chart of an exemplary embodiment of a process for authenticating video content;

FIG. 10, in combination with FIG. 9, is a flow chart of another exemplary embodiment of a process for authenticating video content;

DETAILED DESCRIPTION

Various embodiments of methods and apparatus for authenticating video content are disclosed herein. The exemplary embodiments describe video authentication solutions that combine a video fingerprint and a digital signature. In certain embodiments, the video fingerprint and digital signature are sent separate from (i.e., not embedded with) the video content. In other embodiments, the video fingerprint and digital signature may be embedded in the video content, for example, as a watermark or any suitable embedding technique. The authenticating process described herein is configured to detect when video content is unexpectedly altered, covertly altered, or altered with deceptive intent while still being able to authenticate video content that has legitimately and expectedly been altered during transmission. The various embodiments described herein build upon some of the authentication concepts regarding a self-verification identification card disclosed in U.S. Pat. No. 5,799,092, filed Feb. 25, 1995 and assigned to Lucent Technologies, Inc., the contents of which are fully incorporated herein by reference.

Figure 1:
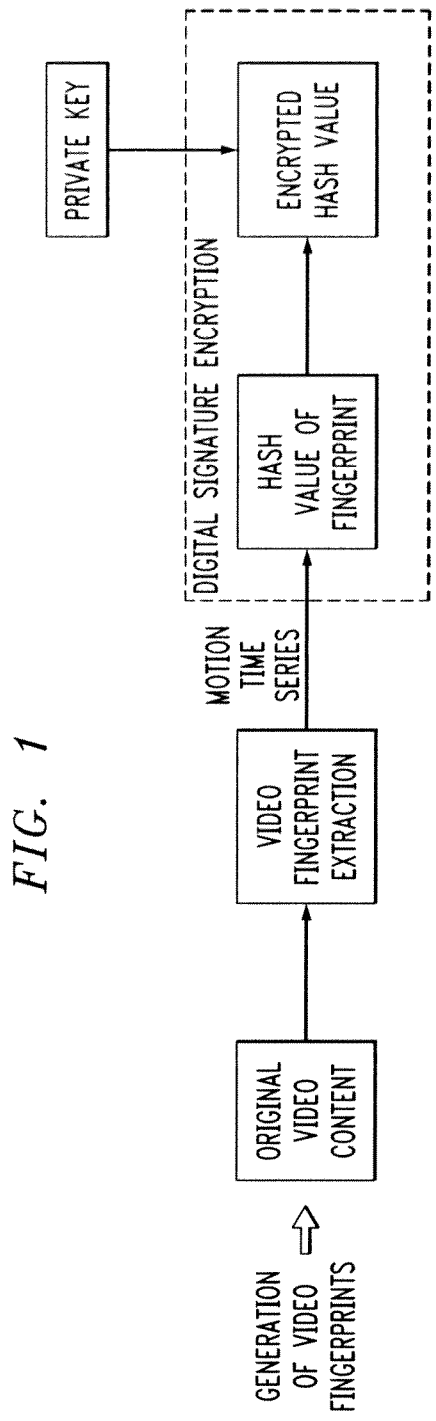
FIG. 1 is a functional diagram showing an exemplary embodiment of a process for authenticating video content.

With reference to FIG. 1, an exemplary embodiment of a process for authenticating video content begins with extracting a video fingerprint from an original video content. This video fingerprint provides a distinctive and concise description of the video content. The video fingerprint is then cryptographically signed to obtain a digital signature. For example, the video fingerprint may be processed using a hash function to obtain a hash value. The original hash value may be encrypted using a private key associated with the source of the original video content to generate the digital signature. The digital signature has two properties: 1) it is unique to the original video, and 2) it cannot be produced by anyone except the owner of the private key, who also captures the true source of the video content. Therefore, the digital signature is a strongly secure means of authenticating the veracity of the video content.

If the video stream is intentionally modified before, during, or after transmission, as it may be for 4G wireless transmission (and other applications), a standard digital signature alone cannot be used to authenticate the video content because the received video content would not necessarily exactly match the original video content for authentication under certain legitimate circumstances. Therefore, an in-the-clear (i.e., unencrypted) video fingerprint is sent to the video recipient along with the digital signature and the in-the-clear (i.e., unencrypted) video content.

More specifically, at the video sender (e.g., video capture, video source, etc.) end, an exemplary embodiment of a process for authenticating video content includes generating a video fingerprint for the original video content. The video fingerprint may be obtained by keeping track of trajectories of salient features of the video content to generate a motion time series. The original video content may be represented by a periodic or randomly sampled sequence of frames. For each sampled frame, a local feature detector, such as a features from accelerated segment test (FAST) algorithm, may be used to detect salient feature points. For additional information on FAST algorithms, see Rosten et al., Machine Learning for High-Speed Corner Detection, Proceedings of European Conference on Computer Vision, 2006, pp. 430-443, the contents of which are fully incorporated herein by reference.

The trajectories of detected feature points may be tracked using optical flow techniques, such as a Lucas-Kanade algorithm. For additional information on Lucas-Kanade algorithms, see Lucas et al., An Iterative Image Registration Technique with an Application to Stereo Vision, Proceedings of DARPA Imaging Understanding Workshop, April, 1981, pp. 121-130, the contents of which are fully incorporated herein by reference.

The orientations of feature point movements may be divided into a certain number of bins. For instance, for eight bins, each bin represents a 45 degree orientation span to cover a 360 degree orientation range (e.g., bin 1-0-45 degrees; bin 2-45-90 degrees, etc.). The feature points are aggregated into each bin based on the angle of orientation. For each bin, a histogram is generated by concatenating the values of the bin over time.

Figure 2:
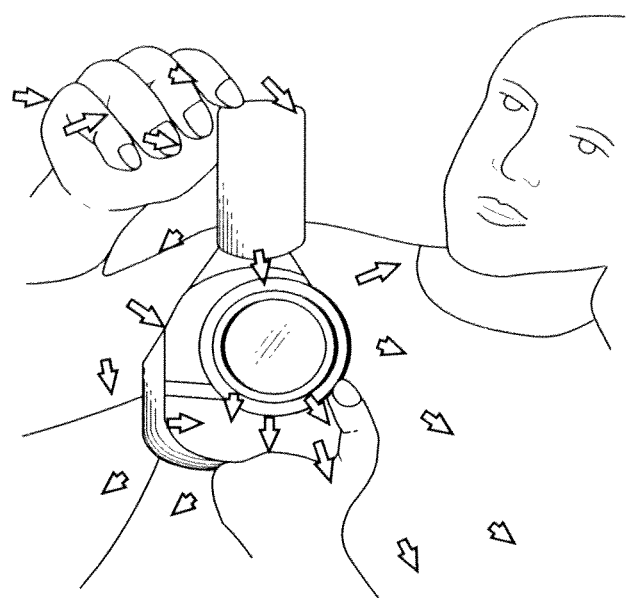
FIG. 2 is an exemplary sample frame of video content that has been analyzed using an exemplary embodiment of a fingerprinting algorithm that detects feature points, computes angular orientations of optical flow for the feature points over time in relation to a next sample frame, and distributes the angular orientations into angular range bins.

With reference to FIG. 2, an example of a video frame with detected feature points and their computed optical flows is shown. The histogram shown in the upper right of the frame represents the values of the bins for the orientations of the optical flows. The uppermost bin is the number of points with an orientation between 0 and 45 degrees. Each bin reflects the number of points for a 45-degree range increasing by 45 degrees going from top to bottom of the histogram. In the image, it can be seen that the salient features are moving in a multitude of directions.

Figure 3:
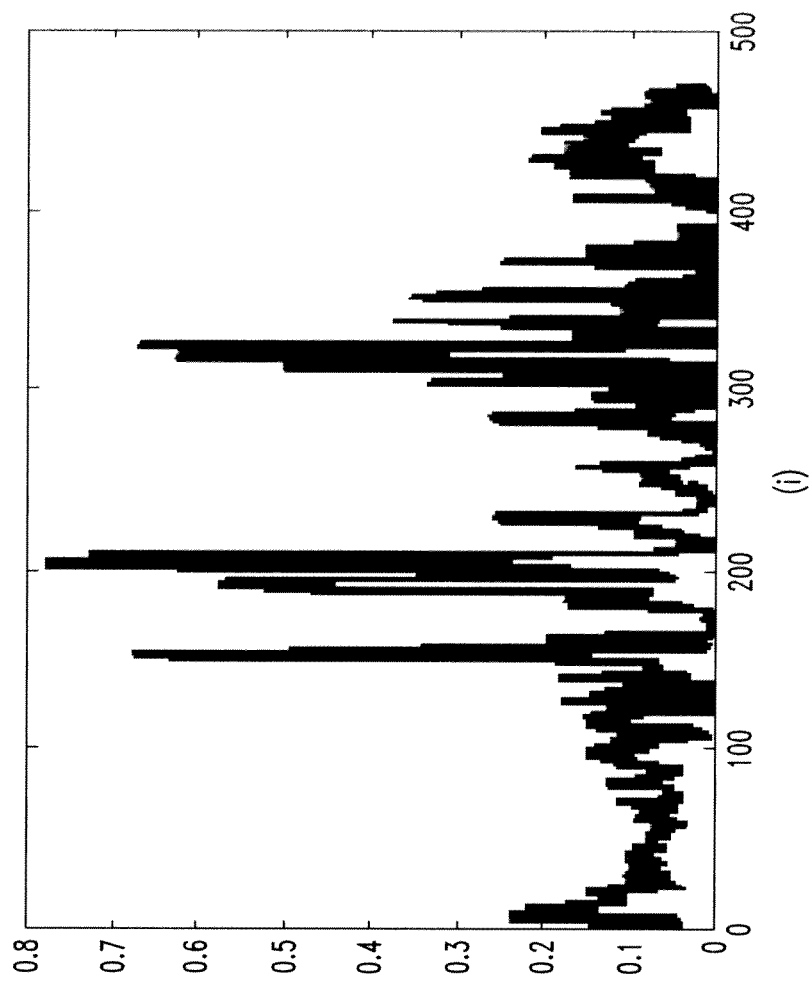
FIG. 3 is a graph showing an exemplary motion time series for an exemplary angular range bin over time in relation to generating a fingerprint for video content using the exemplary embodiment of the fingerprinting algorithm associated with FIG. 2.
Figure 4:
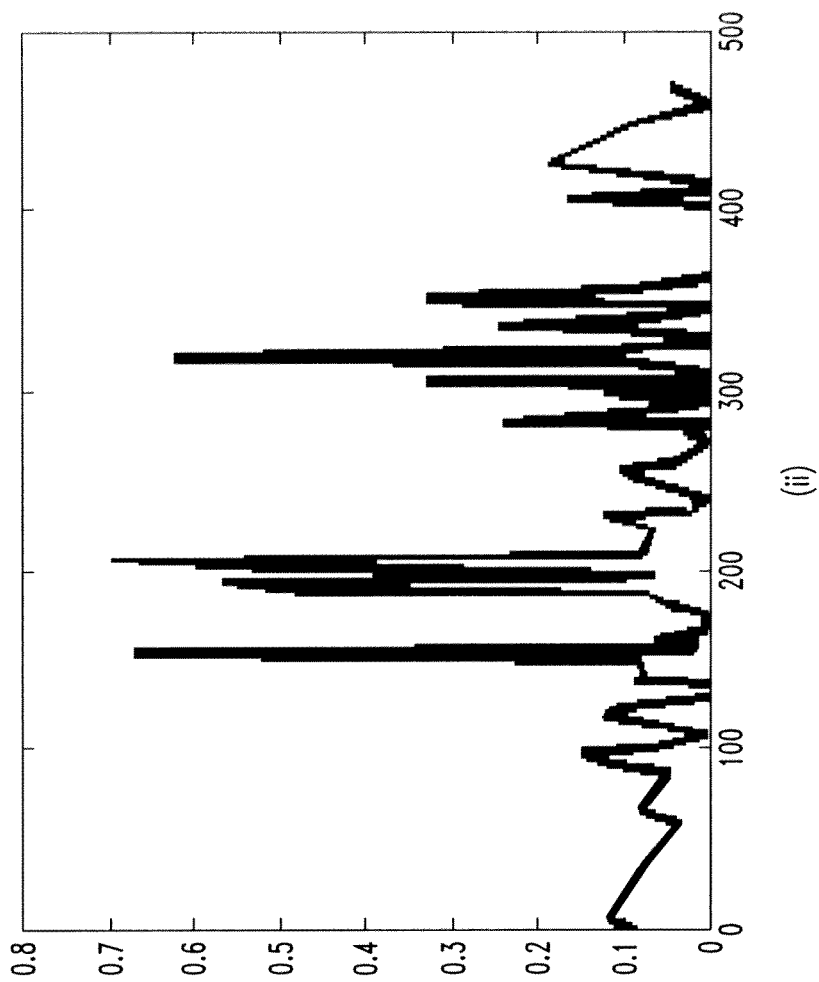
FIG. 4, in graph showing the exemplary motion series of FIG. 3 after linear segmentation processing.
Figure 5:
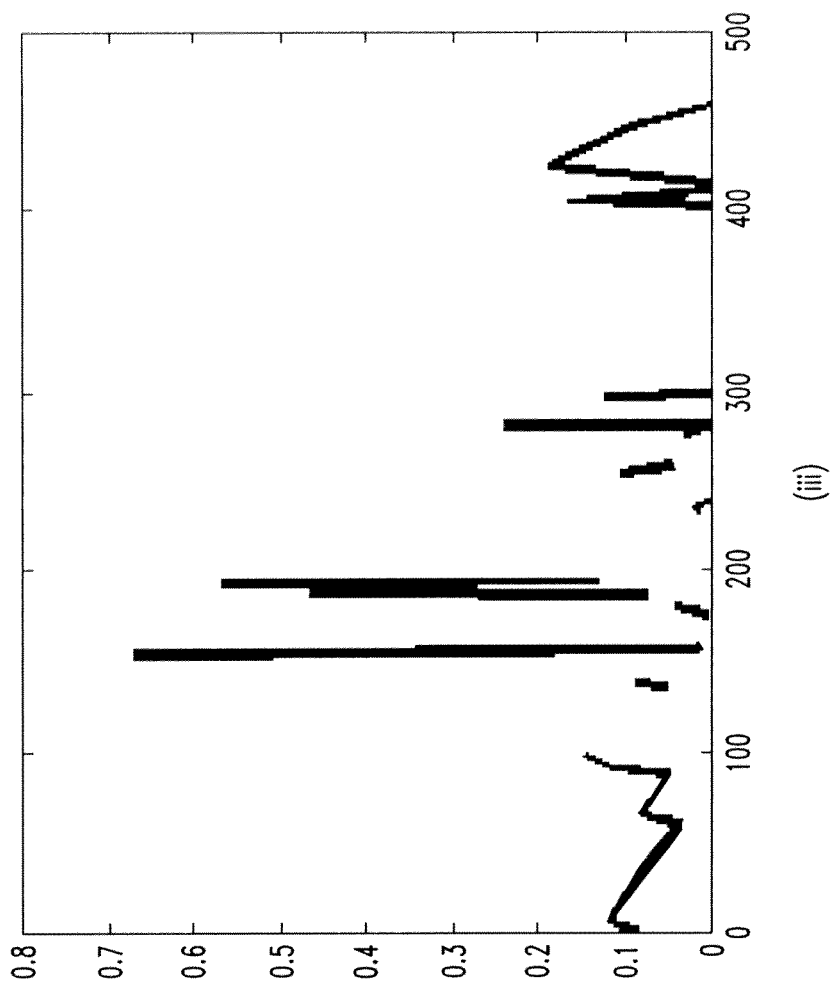
FIG. 5, in graph showing the exemplary motion series of FIG. 4 after major inclines extraction.

Histograms (normalized over time) form motion time series in which the video fingerprint includes a motion time series for each bin. For instance, with eight bins, eight motion time series form the video fingerprint. FIG. 3 shows an example of a time series. FIG. 4 shows an exemplary result after performing liner segmentation on the time series. FIG. 5 shows an exemplary result after extracting major inclines from the linear segmentation.

Returning to FIG. 1, the extracted video fingerprint is passed through a hashing function to produce a large checksum value. For instance, the hashing function may be implemented using a cryptographic hash function known as SHA-1 or another cryptographic hash function known as SHA-256. SHA-1 uses 160 bits and provides security strength of $2^{160}$. SHA-256 use 256 bits and provides security strength of $2^{256}$. For additional information on secure hash algorithms (SHAs) (e.g., SHA-1, SHA-256, etc.), see Federal Information Processing Standards Publication (FIPS PUB) 180-3, Secure Hash Standard (SHS), Information Technology Laboratory, National Institute of Standards and Technology, October, 2008, 32 pages, the contents of which are fully incorporated herein by reference.

The video fingerprint is encrypted with a private key and can be decrypted with a public key. In other words, with the public key, a recipient can decrypt the encrypted video fingerprint to obtain the original video fingerprint. It is not computationally feasible for a third party to modify the encrypted video fingerprint or the unencrypted video fingerprint in a manner that would result in a decrypted video fingerprint produced by an authenticating recipient matching the video fingerprint generated at the sender end, even if the third party has access to the public key. For instance, public key encryption can be implemented using a Rivest-Shamir-Adelman (RSA) algorithm or an elliptic curve cryptography (ECC) algorithm. For additional information on RSA algorithms, see Rivest et al., A Method for Obtaining Digital Signatures and Public-Key Cryptosystems, Communications of the ACM, Vol. 21, No. 2, February, 1978, pp. 120-126, the contents of which are fully incorporated herein by reference. For additional information on ECC algorithms, see: 1) Koblitz, Elliptic Curve Cryptosystems, Mathematics of Computation, Vol. 48, No. 177, January, 1987, pp. 203-209 or 2) Miller, Use of Elliptic Curves in Cryptography, Advances in Cryptology—Crypto Proceedings Lecture Notes in Computer Science, 1986, pp. 417-426. The contents of these Koblitz and Miller documents are fully incorporated herein by reference.

The output from the video sender end includes the in-the-clear video content, the in-the-clear video fingerprint, and the digital signature. There are several ways to send the video fingerprint and the digital signature to the receiver (i.e., recipient) end: 1) together with the original video content in a prepended or appended fashion; 2) through a separate communication path (e.g., secure tunnel); or 3) embedded within the original video content (e.g., as a watermark).

Figure 6:
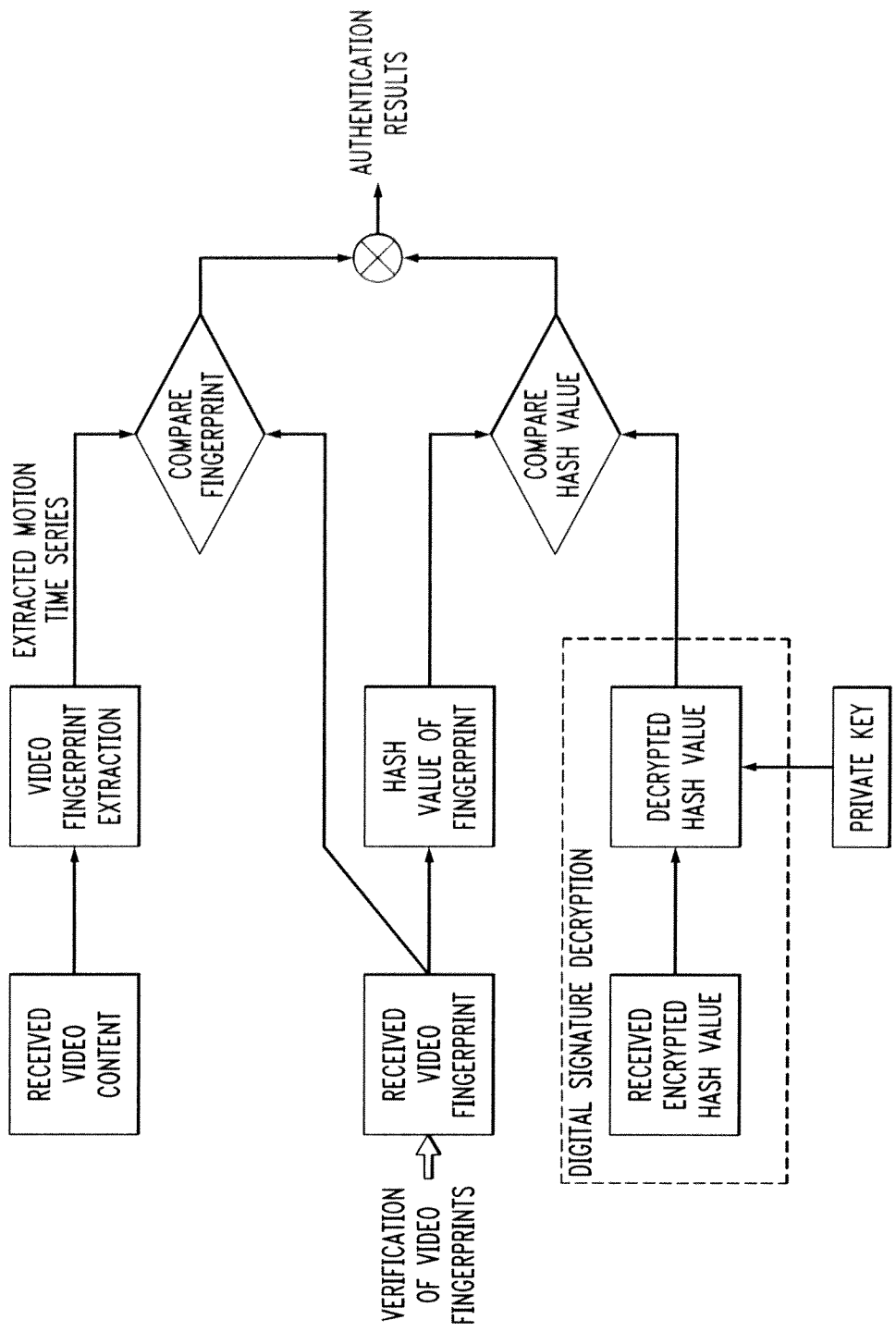
FIG. 6 is a functional diagram showing another exemplary embodiment of a process for authenticating video content.

With reference to FIG. 6, an exemplary embodiment of a process for authenticating video content at a receiver (i.e., recipient) end of a video content transmission includes a two-step process: 1) a received digital signature is decrypted and the resulting decrypted hash value is compared against a fresh (i.e., newly calculated) hash value of a received video fingerprint and 2) a fresh (i.e., newly calculated) video fingerprint is generated from received video content and compared against the received video fingerprint. If the fresh hash value exactly matches the received digital signature and the fresh video fingerprint closely matches the received video fingerprint, the received video content is considered authenticated to the original video content.

More specifically, at the receiver end, a process for authenticating video content includes a verification check based on a digital signature of a video fingerprint of the video content and another verification check based on the video fingerprint. A received digital signature is decrypted using a public key. A received video fingerprint is processed to obtain a fresh hash value using the same hash function used at the sender end. The decrypted hash value is compared to the fresh hash value to check the integrity of the received video fingerprint and the received digital signature. If the decrypted and fresh hash values match, the process continues with the second verification check based on the video fingerprint. If the digital signatures do not match, the process ends and the received video content is considered unauthenticated.

The second verification check includes processing received video content to obtain a fresh video fingerprint using the same video fingerprinting algorithm used at the sender end. The received video fingerprint is compared to the fresh video fingerprint by applying a distance metric for time series matching. Various embodiments of an algorithm that measure the distance metric may be used to either increase the speed or increase the accuracy of such comparisons.

In general, given video fingerprints for the received video content (e.g., Q) and the original video content (e.g., C), the distance metric is used to find the minimal similarity distance between the corresponding time series in the two video fingerprints. Various modifications in video content cause multiple complexities in motion time series. The resulting time series from such modifications (possibly distorted by offset, amplitude and phase scaling, warping, occlusion) frequently have different amounts of peaks and valleys. Commonly used similarity measuring techniques, such as dynamic time warping or providing partial alignment of some of the peaks and valleys do not fully solve the problem. To tackle the various complexities in matching motion time series, a complexity-invariant distance measure algorithm is used to determine complexity differences between two time series as a correction factor for existing distance measures. For additional information on complexity-invariant distance measure algorithms, see, e.g., Batista et al., A Complexity-Invariant Distance Measure for Time Series, Proceedings of Society of Industrial and Applied Mathematics (SIAM) Conference on Data Mining, Apr. 28-30, 2011, Mesa, Ariz., pp. 699-710, the contents of which are fully incorporated herein by reference.

The complexity-invariant distance measure algorithm was empirically found to be sufficiently robust against noise introduced by video transformations. Formally, given $Q=\{\{\theta_{i,j}: 0 \le i \le f\}: 0 \le j < b\}$ and $C=\{\{\tau_{i,j}: 0 \le i \le g\}: 0 \le j < b\}$ (assuming $g \ge f$), the distance D between the two corresponding time series $Q_j$, $C_j$ may be computed for each histogram bin j, $0 \le j < b$, where b is the total number of bins, as follows:

$$D(Q_j, C_j) = \min\{D_{CIV}(Q_j, C_{i \ldots i+f-1, j}): 0 \le i \le g-f\}$$

The minimum occurs when $C_{i \ldots i+f-1, j} = \{\tau_{i,j}: i^* \le i \le i^*+f\}$ wherein $i^*$ is the minimizing temporal alignment offset, $0 \le i^* \le g-f$.

The complexity-invariant distance $D_{CIV}$ may be computed as:

$$D_{CIV}(Q_j, C_j) = \frac{\max\{K(Q_j), K(C_j)\}}{\min\{K(Q_j), K(C_j)\}} D_E(Q_j, C_j)$$

Where $D_E$ is the Euclidean distance and $K(Q_j)$ is a measure of complexity for time series $Q_j=\{\theta_{i,j}: 0 \le i \le f\}$ for histogram bin j. For example, $K(Q_j)$ may be defined as:

$$K(Q_j) = \sqrt{\sum_{i=0}^{f-2} (\theta_{i,j} - \theta_{i+1,j})^2}$$

Similarly, $K(C_j)$ is a measure of complexity for corresponding time series $C_j=\{\tau_{i,j}: 0 \le i \le g\}$ for histogram bin j and may be defined using like notation.

Intuitively, $K(Q_j)$ measures the root-mean-square (RMS) of the series' derivative, thereby giving more weight to series with greater variance. The b time series distances may be computed for each corresponding pair. Finally, a score $\Delta(Q, C)$ for the corresponding pair may be computed. The score $\Delta(Q,C)$ is a tuple containing the number of time series distances above a certain threshold d and the average of those distances. For example, for $$\text{distance} = \{D(Q_j, C_j): 0 \le j < b \text{ and } D(Q_j, C_j) > d\},$$

$$\Delta(Q, C) = \left(|\text{distance}|, \frac{\sum \text{distance}}{|\text{distance}|}\right)$$

The method is not overly sensitive to d, which may be determined heuristically. Scores $\Delta$ for corresponding pairs may be ranked by |distance| (descending) and by the average distance (ascending). Matching videos should have b matching time series with an average distance of zero.

When comparing two time series of different lengths without temporal warping, the time series should be aligned. This can be done linearly, but linear techniques may be slow and inefficient. For a more efficient comparison, a major inclines matching process may be used to quickly compute the temporal offset between the two time series to synchronize the received and fresh video fingerprints. The major inclines matching technique uses linear segmentation for each time series to approximate temporal traces of the histogram and then extracts major inclines that have longer distances or deeper heights from the linear segments. The two major inclines are similar if they have similar lengths and heights. Similarity of the two major inclines indicates a potential alignment between the compared histograms. Base on the potential alignment positions, the complexity-invariant similarity distance between the compare video fingerprints may be calculated. If the similarity distance is less than a predetermined threshold value, the two video fingerprints are considered a complexity-invariant match and the video content is authenticated (if the digital signature also matches). If the similarity distance is not less than the predetermined threshold value, the received video content is considered unauthenticated.

More specifically, major inclines matching techniques apply a linear segmentation step that may use a bottom-up segmentation algorithm to approximate time series by compressing them into a sequence of linear segments. For additional information on bottom-up segmentation algorithms, see Keogh et al., An Online Algorithm for Segmenting Time Series, Proceedings of IEEEE International Conference on Data Mining, Nov. 29-Dec. 2, 2001, pp. 289-296, the contents of which are fully incorporated herein by reference.

The individual segments may be compared against one another. Two linear segments are compared by sliding the shorter one against the longer one, and computing the complexity-invariant distance between them, as described above. However, alignment can be reduced or simplified by selecting linear segments that are "higher" in relation to amplitude and/or "longer" in relation to time. The selected segments can be called the major inclines. An example of the major inclines matching process is shown in FIGS. 3-5.

More specially, finding major inclines includes dividing a sequence of linear segments into equal intervals of length p according to time. A linear segment is considered within an interval if the starting time point is within the interval. From each interval, z linear segments are selected with the greatest heights and with lengths above some given threshold, length (l). Note that for videos of different lengths, the major inclines of the shorter video may be discarded by a longer video. Hence, it is better to select a length p that is suitable for the shorter video.

Once major inclines are computed, they can be compared pairwise. Two major inclines are considered similar if they have similar lengths and heights (the exact distance measure does not appear critical, as long as it is not overly restrictive). The similarity of two major inclines indicates a probable alignment position, i*, of the compared time series. The complexity-invariant distance is calculated according to those alignment positions. The overall comparison time is reduced since the computation is restricted to those positions.

With reference to FIGS. 1 and 6, an exemplary embodiment of the video fingerprint extraction performed at the sender and receiver ends utilizes the same video fingerprint algorithm. Intuitively, the video fingerprints at each end seek to capture trajectories of motion of the most salient features of the video across time. This may be done by extracting features using a histograms of orientations of optical flow (HOOF) algorithm. For additional information on HOOF algorithms, see Chaudhry et al., Histograms of Oriented Optical Flow and Binet-Cauchy Kernals on Nonlinear Dynamical Systems for the Recognition of Human Actions, IEEE Conference on Computer Vision and Pattern Recognition, 2009, pp. 1932-1939, the contents of which are fully incorporated herein by reference.

Figure 7:
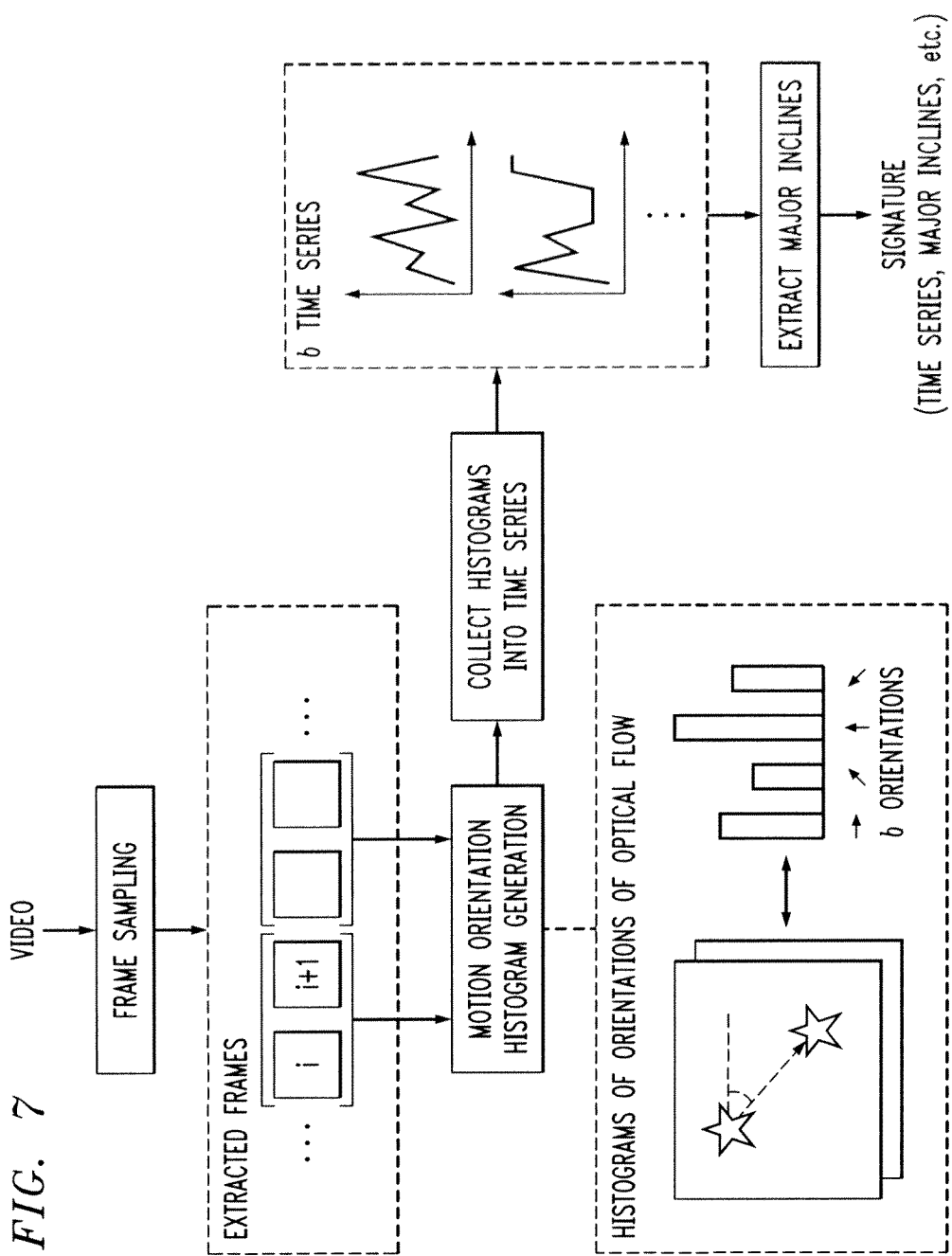
FIG. 7 is a functional diagram showing an exemplary embodiment of a process for generating a video fingerprint of a video content.

With reference to FIG. 7, an exemplary embodiment of a video fingerprint algorithm accepts video content Q as input which is represented as a sequence of f uniformly sampled frames $Q=\{q_0, q_1, \ldots, q_{f-1}\}$. A histogram of orientations of optical flow may be generated for each consecutive pair of frames $q_i, q_{i+1}$. Salient local features (i.e., keypoints) in frame $q_i$ may be detected using a feature detector algorithm, such as FAST. The optical flow of the keypoints from frame $q_i$ to $q_{i+1}$ may be computed by applying the Lucas-Kanade algorithm. Trajectories with a magnitude within a realistic range may be retained. The orientations of retained trajectories with equal weight may be binned into b bins and the histogram may be normalized. For example, eight bins may be chosen, b=8 bins. Binning with equal weight produces more robust fingerprints compared to weighting by magnitude as erroneously computed trajectories are mitigated by the (more plentiful) accurate trajectories.

For each pair of consecutive frames $\{q_i, q_{i+1}\}$, a histogram: $\{\theta_{i,j}: 0 \leq j < b\}$ now exists, where $\theta_{i,j}$ records the number of keypoints that moved in a given orientation. Examples of frames with detected keypoints, their optical flows, and the histogram of orientations of optical flows are given in FIG. 2. The bins may be aggregated across time to produce the final fingerprint which includes b time series (one for each orientation bin):

$$\{\{\theta i,j: 0 \leq i < f\}: \theta i,j: 0 \leq j < b\}$$

Matching is considered computationally inexpensive compared to fingerprint generation, due to the technique describe above for comparing the video fingerprint received from the sender end to the video fingerprint generated at the receiver end.

A local feature detector can be chosen to track local features instead of uniformly sampled points despite the additional computational cost because: 1) the resultant optical flows are more reliable and 2) it is consistent with the intuition that the motion of the most salient features of each frame in the video is the most definitive part.

Various existing local feature detector algorithms were compared, including a scale-invariant feature transformation (SIFT) algorithm, a speeded up robust feature (SURF) algorithm, and FAST. For additional information on SIFT algorithms, see Lowe, Distinctive Image Features from Scale-Invariant Keypoints, International Journal of Computer Vision, Vol. 60, Issue 2, November, 2004, pp. 91-110, the contents of which are fully incorporated herein by reference. For additional information on SURF algorithms, see Bay et al., SURF: Speeded Up Robust Features, Computer Vision and Image Understanding, Vol. 110, Issue 3, June, 2008, pp. 346-359, the contents of which are fully incorporated herein by reference.

FAST was selected over SIFT and SURF because it runs significantly faster (due to being computed through direct pixel comparisons) and produces more keypoints. The additional keypoints are an advantage because the effect of inaccurate keypoint tracking is mitigated. Although FAST demonstrates less robustness, it is nonetheless sufficient for tracking slight changes from frame to frame.

The various methods and apparatus described herein provide a robust and compact video fingerprint technique that enables efficient real-time video authentication to defend against content modification and man-in-the-middle attacks of surveillance video and other types of video content. Surveillance video, for example, is playing a larger and crucial part in public safety and homeland security. This is especially timely and pertinent to the security of LTE mobile video which may be used for public safety and first responder communications. The methods described herein can also be used to authenticate archived video that may be used as evidence for law enforcement and criminal prosecution. The video fingerprint extraction technique is format- and codec-module compliant.

For example, to demonstrate the robustness and efficacy of the methods described herein with regards to speed and precision. A publicly available video database, MUSCLE VCD benchmark, was used to conduct comparative performance analysis. The database consists of 101 videos with a total length of 80 hours. This database provides videos from a variety of programs, such as sports programs, documentaries, cartoons, home movies, old black and white movies, commercials, etc. The MUSCLE VCD benchmark contains a set of ground truth data ST1, which includes 15 queries with a combined duration of 2 hour 30 min. They are copies of videos from five minutes to one hour long. The query videos underwent extensive transformations, including resizing, re-encoding, camcording with an angle, cropping and changing of color characteristics, zooming, adding noise, blurring, and changing subtitles, etc. The total query time was measured, including the amount of time needed to generate signatures for all the query videos and search for them in the database. The test machine was an Intel Xeon quad-core processor running at 2.26 GHz with 16 GB of RAM. With reference to FIG. 8, the demonstration showed that the process uses less than ten minutes to search all the queries in ST1 with high accuracy. The time for the best score obtained by demonstration teams took 44 min. For video content authentication, using video fingerprints based on trajectories of movement of salient feature points and matching video fingerprints according to major incline alignment was feasible and practical using the methods described herein.

The various methods and apparatus described herein can be implemented to provide video content authentication for video surveillance systems. The video content authentication process described herein can be used in combination with any algorithm for calculating a video fingerprint. This demonstrates how robust the process is with respect to various algorithms that could be implemented for various steps of the process. The process also provides a compact video fingerprint for video content authentication in relation to existing video authentication techniques.

Another exemplary embodiment of a process for authenticating video content is described in terms of accuracy of a video fingerprint in order to explain how it may be used and applicable to surveillance. The overall process falls under a content-based category of media authentication methods, but uses higher-level features than previous methods. Local salient features are detected in video content from sampled frames and capture trajectories of motion of those features across time as motion time series. Motion has been used for short term (2-frame) motion vectors from compression coding (e.g., MPEG-4). Higher level features would normally be regarded as incurring too high a computational load; however, higher level features are already used to reduce bandwidth and error rate of false alerts. Since this more robust feature (than single or 2-frame methods) is already being calculated, use for authentication has no additional computational cost. The fingerprint of a sampled frame is a certain number of bin values, which are obtained by binning the orientations of motion trajectories of local features into bins. For example, eight bins may be used in one exemplary implementation.

The authentication scheme uses a robust method for hash-matching instead of a robust hash. Formally, a sequence of fingerprints is presented as, $$F=\{\{f_{i,j}:0\le i<m\}:0\le j<B\},$$

where F is the sequence of fingerprints, f is a fingerprint of a sampled frame, m is the length of sampled frame sequence and B is the total number of bins. Each frame fingerprint is digitally signed (hashed and private-key encrypted). This is not robust to video distortions, however in addition to the digital signature, a digital fingerprint in the clear (i.e., unencrypted) is include in the transmission to the receiver. To authenticate the video content, the receiver hashes the video fingerprint using a public seed, to obtain $H_1'$. The digital signature is decrypted using the public key. The resulting hash, $H_2'$, is compared with $H_1'$. The video fingerprint for the received video is calculated to obtain $F_1'$. The calculated video fingerprint $F_1'$ is compared to the received video fingerprint $F_2'$. If $H_1'=H_2'$ and the similarity distance $D(F_1', F_2')\le$dist, then the corresponding video content frame is authenticated, where dist is a distance threshold.

Since a video fingerprint is represented as time series, $D(F_1', F_2')$ can be calculated by measuring the distance between time series. Various modifications in video transmission, due to scaling, transcoding and packet loss, etc., cause multiple complexities in time series. The resulting time series (possibly distorted by offset, amplitude and phase scaling, etc.) frequently have different amounts of peaks and valleys. To tackle the various complexities in matching video fingerprints, a complexity-invariant distance measure of Batista may be implemented. The complexity-invariant distance measure uses complexity differences between two time series as a correction factor for existing distance measures. The complexity-invariant distance $D_{CIV}$ may be computed as:

$$D_{CIV}(F_{1j}, F_{2j}) = \frac{\max\{K(F_{1j}), K(F_{2j})\}}{\min\{K(F_{1j}), K(F_{2j})\}} D_E(F_{1j}, F_{2j})$$

$$K(F_j) = \sqrt{\sum_{i=0}^{m-2}(f_{i,j} - f_{i+1,j})^2}$$

Where $F_{1j}$ and $F_{2j}$ are two time series for a histogram bin j, $D_E$ is the Euclidean distance and $K(F_j)$ is a measure of complexity of time series. Intuitively, $K(F_j)$ measures the RMS of the series derivative, thereby giving more weight to series with greater variance.

After the similarity distances are obtained for B time series, a score $\Delta(F_1, F_2)$ for the compared fingerprint pair may be computed. The score $\Delta(F_1, F_2)$ is a tuple containing the number of time series distances above a certain threshold dist and the average of those distances. That is, for $$D_{total} = \{D_{CIV}(F_{1j}, F_{2j}) : 0 \le j < B, \text{ and } D_{CIV}(F_{1j}, F_{2j}) > dist\},$$

$$\Delta(F_1, F_2) = \left(|D_{total}|, \frac{\sum D_{total}}{|D_{total}|}\right)$$

The method is not overly sensitive to dist which may be determined heuristically. Two identical videos should have all bins matched with an average distance of 0.

With reference to FIG. 9, an exemplary embodiment of a process 900 for authenticating video content begins at 902 where a digital signature, an unsecured video fingerprint, and an unsecured video content is received from a transmitting node at a receiving node in a communication network. Next, the process determines if the digital signature is consistent with the unsecured video fingerprint at the receiving node to verify the unsecured video fingerprint (904). At 906, the process determines if the unsecured video fingerprint is consistent with the unsecured video content at the receiving node to verify the unsecured video content in a manner that tolerates a predetermined measure of loss in the unsecured video content. If the unsecured video fingerprint and the unsecured video content are verified, the unsecured video content is authenticated for subsequent use at the receiving node.

In another embodiment of the process 900, the digital signature is prepended, embedded, or appended with the unsecured video content for transmission to the receiving node. In this embodiment, the process 900 also includes separating the digital signature from the unsecured video content at the receiving node.

In yet another embodiment of the process 900, the unsecured video fingerprint is prepended, embedded, or appended with the unsecured video content for transmission to the receiving node. In this embodiment, the process 900 also includes separating the unsecured video fingerprint from the unsecured video content at the receiving node.

In still another embodiment of the process 900, if the unsecured video fingerprint is not verified by the receiving node, the unsecured video content is not authenticated for subsequent use at the receiving node. In still yet another embodiment of the process 900, if the unsecured video fingerprint is verified and the unsecured video content is not verified by the receiving node, the unsecured video content is not authenticated for subsequent use at the receiving node.

In another embodiment of the process 900, the digital signature and the unsecured video content are received at the receiving node in separate communication sessions via different communication paths. In yet another embodiment of the process 900, the unsecured video fingerprint and the unsecured video content are received at the receiving node in separate communication sessions via different communication paths.

In various embodiments, the unsecured video fingerprint is a received version of an original video fingerprint. The original video fingerprint is derived from an original video content using a fingerprinting algorithm prior to transmission of the original video fingerprint by the transmitting node. The digital signature is produced from an original hash value using an encryption algorithm and a private key prior to transmission of the digital signature by the transmitting node. The original hash value is derived from the original video fingerprint using a hashing algorithm prior to encryption of the original hash value. The unsecured video content is a received version of the original video content.

With reference to FIGS. 9 and 10, another exemplary embodiment of a process 1000 for authenticating video content extends the process 900 of FIG. 9 in conjunction with verifying the unsecured video fingerprint (904). In this embodiment, the process 1000 advances from 904 of FIG. 9 to 1002 where the digital signature is decrypted at the receiving node using a decryption algorithm and a public key to obtain a decrypted hash value relating to the original hash value. Next, the unsecured video fingerprint is processed at the receiving node using the hashing algorithm to obtain a fresh hash value relating to the original hash value (1004). At 1006, the fresh hash value is compared to the decrypted hash value at the receiving node such that the unsecured video fingerprint is verified if the fresh hash value matches the decrypted hash value. In this embodiment, the process 1000 returns to 906 after 1006. In another embodiment of the process 1000, if the fresh hash value does not match the decrypted hash value, the unsecured video fingerprint is not verified.

Figure 11:
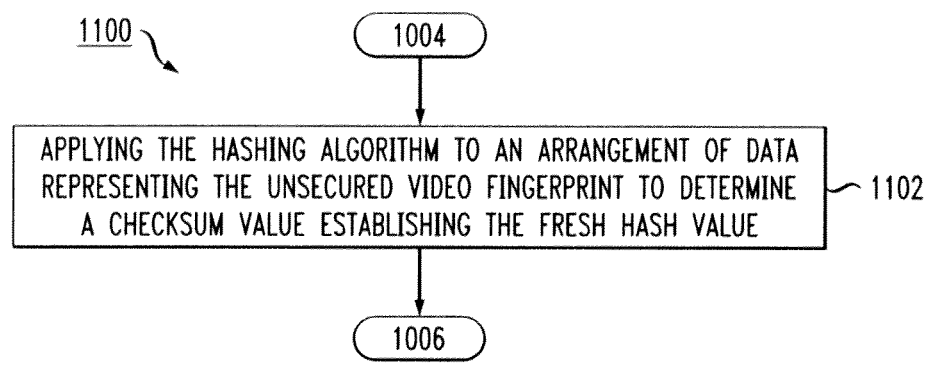
FIG. 11, in combination with FIGS. 9 and 10, is a flow chart of yet another exemplary embodiment of a process for authenticating video content.

With reference to FIGS. 9-11, another exemplary embodiment of a process 1100 for authenticating video content extends the process 1000 of FIG. 10 in conjunction with using the hash algorithm (1004). In this embodiment, the process 1100 advances from 1004 of FIG. 10 to 1102 where the hashing algorithm is applied to an arrangement of data representing the unsecured video fingerprint to determine a checksum value establishing the fresh hash value. In this embodiment, the process 1100 returns to 1006 after 1102.

Figure 12:
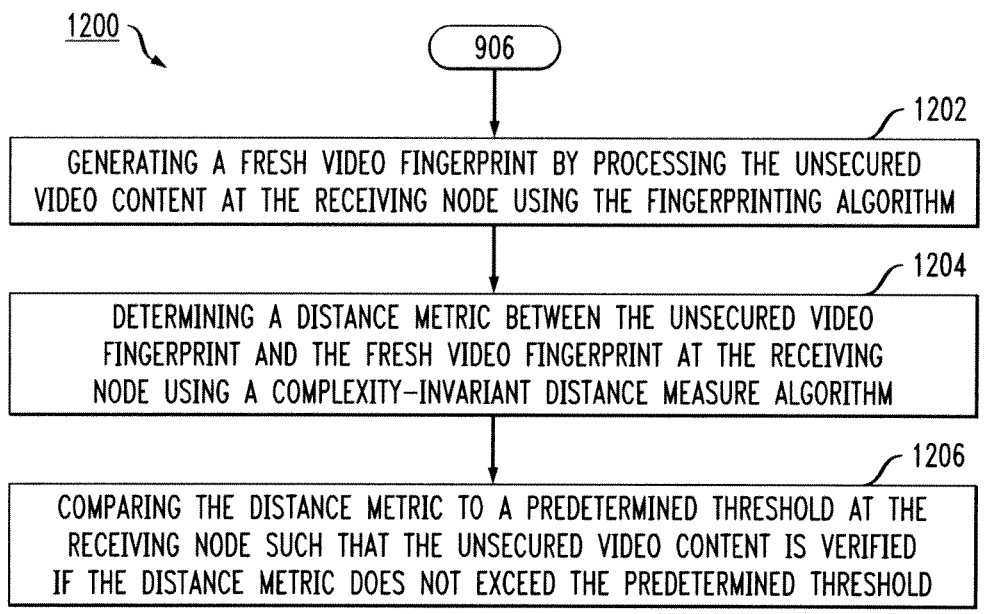
FIG. 12, in combination with FIG. 9, is a flow chart of still another exemplary embodiment of a process for authenticating video content.

With reference to FIGS. 9 and 12, another exemplary embodiment of a process 1200 for authenticating video content extends the process 900 of FIG. 9 in conjunction with verifying the unsecured video content (906). In this embodiment, the process 1200 advances from 906 of FIG. 9 to 1202 where a fresh video fingerprint is generated at the receiving node by processing the unsecured video content using the fingerprinting algorithm. Next, the process determines a distance metric between the unsecured video fingerprint and the fresh video fingerprint at the receiving node using a complexity-invariant distance measure algorithm (1204). At 1206, the distance metric is compared to a predetermined threshold at the receiving node such that the unsecured video content is verified if the distance metric does not exceed the predetermined threshold. In another embodiment of the process 1200, if the distance metric exceeds the predetermined threshold, the unsecured video content is not verified.

Figure 13:
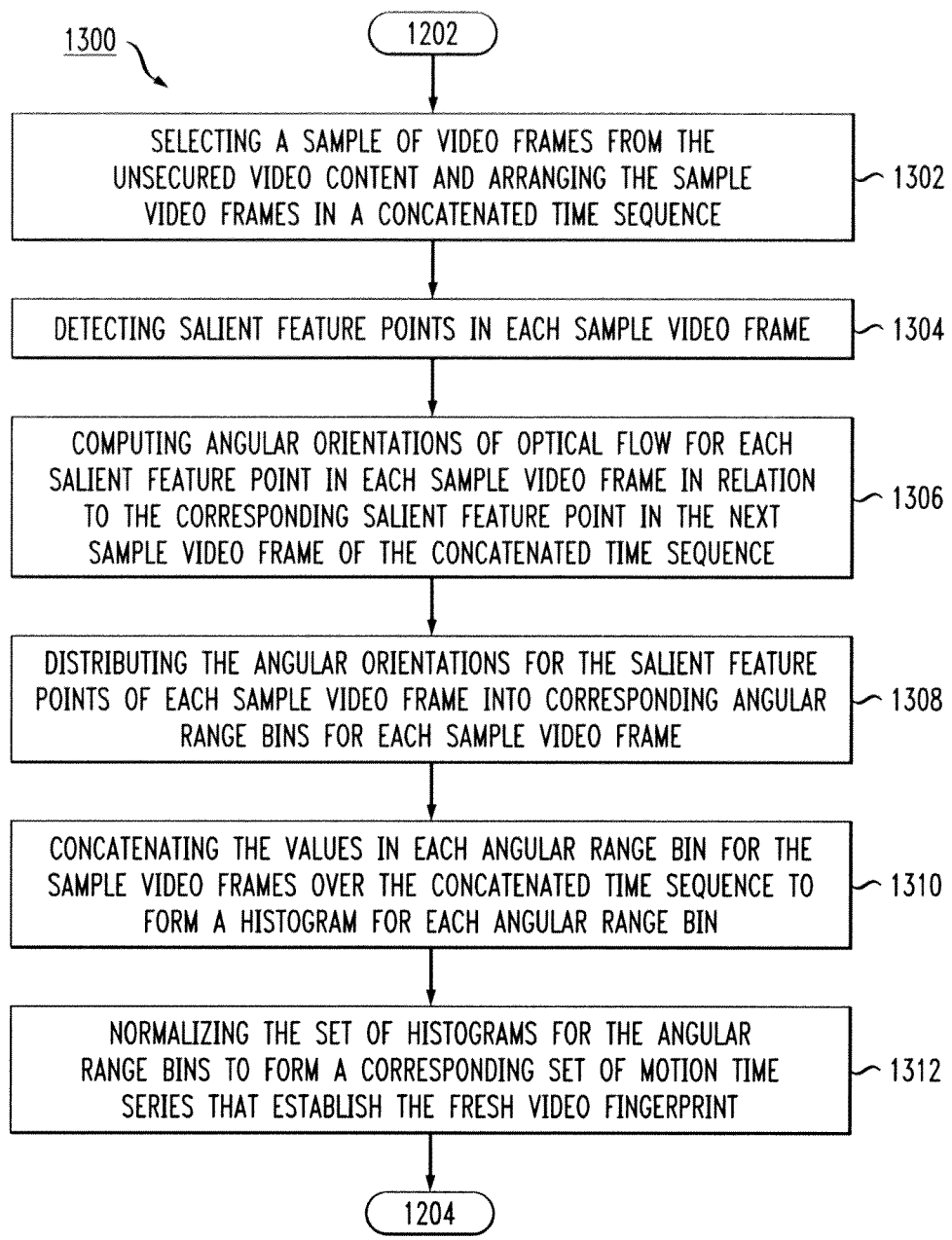
FIG. 13, in combination with FIGS. 9 and 12, is a flow chart of still yet another exemplary embodiment of a process for authenticating video content.

With reference to FIGS. 9, 12, and 13, another exemplary embodiment of a process 1300 for authenticating video content extends the process 1200 of FIG. 12 in conjunction with using the fingerprinting algorithm (1202). In this embodiment, the process 1300 advances from 1202 of FIG. 12 to 1302 where a sample of video frames are selected from the unsecured video content and arranged in a concatenated time sequence. Next, salient feature points are detected in each sample video frame (1304). At 1306, angular orientations of optical flow are computed for each salient feature point in each sample video frame in relation to the corresponding salient feature point in the next sample video frame of the concatenated time sequence. Next, the angular orientations for the salient feature points of each sample video frame are distributed into corresponding angular range bins for each sample video frame (1308). At 1310, the values in each angular range bin for the sample video frames are concatenated over the concatenated time sequence to form a histogram for each angular range bin. Next, the set of histograms for the angular range bins are normalized to form a corresponding set of motion time series that establish the fresh video fingerprint (1312).

In another embodiment, in conjunction with using the fingerprinting algorithm to establish the fresh video fingerprint, the process 1300 also includes compressing each motion time series using a linear segmentation algorithm to convert the corresponding histogram into a corresponding sequence of linear segments. In this embodiment, major inclines are extracted from each compressed motion time series based at least in part on selecting linear segments that are greater than a predetermined threshold value for at least one of a time characteristic and an amplitude characteristic to form a corresponding set of motion time series for the fresh video fingerprint represented by the extracted major inclines.

With reference again to FIGS. 9 and 12, in another embodiment of the process 1200, the original video fingerprint, unsecure video fingerprint, and fresh video fingerprint each comprise a corresponding set of motion time series formed by reducing corresponding histograms to sequences of linear segments and extracting major inclines from the sequences of linear segments. In this embodiment, in conjunction with using the complexity-invariant distance measure algorithm, the process 1200 also includes pairing each motion time series of the unsecured video fingerprint with a corresponding motion time series of the fresh video fingerprint. Each paired motion time series are aligned based at least in part on identification of similar major inclines in the corresponding paired motion time series. A distance measure between each aligned motion time series is determined using the complexity-invariant distance measure algorithm.

In yet another embodiment of the process 1200, the original video fingerprint, unsecure video fingerprint, and fresh video fingerprint each comprise a corresponding set of motion time series formed by corresponding histograms. In this embodiment, in conjunction with using the complexity-invariant distance measure algorithm, the process 1200 also includes compressing each motion time series of the unsecure video fingerprint using a linear segmentation algorithm to convert the corresponding histogram into a corresponding sequence of linear segments, Major inclines are extracted from each compressed motion time series of the unsecure video fingerprint based at least in part on selecting linear segments that are greater than a predetermined threshold value for at least one of a time characteristic and an amplitude characteristic to form a corresponding set of motion time series for the unsecure video fingerprint represented by the extracted major inclines. Each motion time series of the fresh video fingerprint is compressed using the linear segmentation algorithm to convert the corresponding histogram into a corresponding sequence of linear segments. Major inclines are extracted from each compressed motion time series of the fresh video fingerprint based at least in part on selecting linear segments that are greater than the predetermined threshold value for at least one of the time characteristic and the amplitude characteristic to form a corresponding set of motion time series for the fresh video fingerprint represented by the extracted major inclines. Each motion time series of the unsecured video fingerprint is paired with a corresponding motion time series of the fresh video fingerprint. Each paired motion time series is aligned based at least in part on identification of similar major inclines in the corresponding paired motion time series. A distance measure between each aligned motion time series is determined using the complexity-invariant distance measure algorithm.

Figure 14:
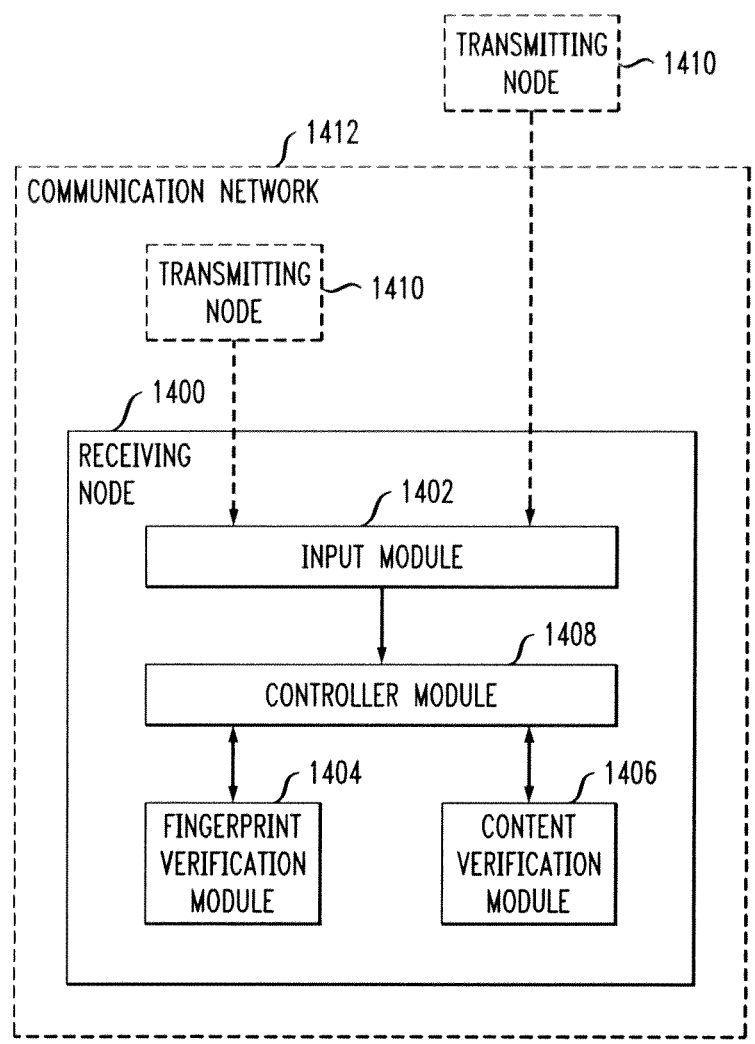
FIG. 14 is a block diagram of an exemplary embodiment of a receiving node for authenticating video content.

With reference to FIG. 14, an exemplary embodiment of a receiving node 1400 for authenticating video content includes an input module 1402, a fingerprint verification module 1404, a content verification module 1406, and a controller module 1408. The input module 1402 configured to receive a digital signature, an unsecured video fingerprint, and an unsecured video content from a transmitting node 1410 via a communication network 1412. The transmitting node 1410 may be a network node in the communication network 1412 or a user or computing device with access to the communication network 1412. The communication network 1412 may be a hybrid communication network comprising various types of network architectures, communication protocols, and technologies in any suitable combination. The fingerprint verification module 1404 configured to determine if the digital signature is consistent with the unsecured video fingerprint to verify the unsecured video fingerprint. The content verification module 1406 configured to determine if the unsecured video fingerprint is consistent with the unsecured video content to verify the unsecured video content in a manner that tolerates a predetermined measure of loss in the unsecured video content. The controller module 1408 in operative communication with the input module 1402, fingerprint verification module 1404, and content verification module 1406 and configured to control operations such that, if the unsecured video fingerprint and the unsecured video content are verified, the unsecured video content is authenticated for subsequent use.

In another embodiment of the receiving node 1400, the digital signature is prepended, embedded, or appended with the unsecured video content for transmission. In this embodiment, the receiving node 1400 also includes a video processing module in operative communication with the input module 1402 and the controller module 1408. The video processing module and configured to separate the digital signature from the unsecured video content.

In yet another embodiment of the receiving node 1400, the unsecured video fingerprint is prepended, embedded, or appended with the unsecured video content for transmission. In this embodiment, the receiving node 1400 also includes a video processing module in operative communication with the input module 1402 and the controller module 1408. The video processing module configured to separate the unsecured video fingerprint from the unsecured video content.

In still another embodiment of the receiving node 1400, if the unsecured video fingerprint is not verified by the fingerprint verification module 1404, the controller module 1408 is configured such that the unsecured video content is not authenticated for subsequent use. In still yet another embodiment of the receiving node 1400, if the unsecured video fingerprint is verified by the fingerprint verification module 1404 and the unsecured video content is not verified by the content verification module 1406, the controller module 1408 is configured such that the unsecured video content is not authenticated for subsequent use.

In another embodiment of the receiving node 1400, the digital signature and the unsecured video content are received by the input module 1402 in separate communication sessions via different communication paths. In another embodiment of the receiving node 1400, the unsecured video fingerprint and the unsecured video content are received by the input module 1402 in separate communication sessions via different communication paths.

In various embodiments of receiving nodes 1400, the unsecured video fingerprint is a received version of an original video fingerprint. The original video fingerprint is derived from an original video content using a fingerprinting algorithm prior to transmission of the original video fingerprint by the transmitting node 1410. The digital signature is produced from an original hash value using an encryption algorithm and a private key prior to transmission of the digital signature by the transmitting node 1410. The original hash value is derived from the original video fingerprint using a hashing algorithm prior to encryption of the original hash value. The unsecured video content is a received version of the original video content.

Figure 15:
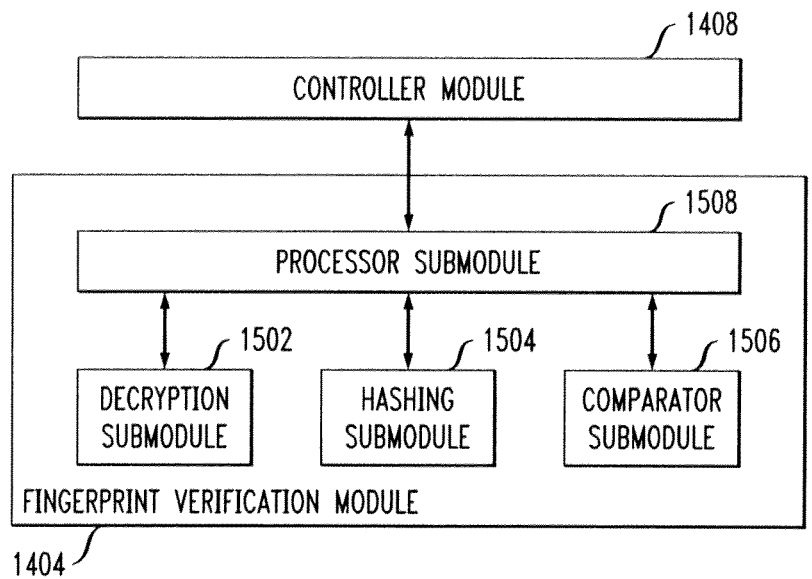
FIG. 15 is a block diagram of an exemplary embodiment of a fingerprint verification module associated with the receiving node of FIG. 14.

With reference to FIG. 15, an exemplary embodiment of the fingerprint verification module 1404 includes a decryption submodule 1502, a hashing submodule 1504, a comparator submodule 1506, and a processor submodule 1508 for verifying the unsecured video fingerprint in conjunction with the controller module 1408. The decryption submodule 1502 configured to decrypt the digital signature using a decryption algorithm and a public key to obtain a decrypted hash value relating to the original hash value. The hashing submodule 1504 configured to process the unsecured video fingerprint using the hashing algorithm to obtain a fresh hash value relating to the original hash value. The comparator submodule 1506 configured to compare the fresh hash value to the decrypted hash value such that the unsecured video fingerprint is verified if the fresh hash value matches the decrypted hash value. The processor submodule 1508 in operative communication with the decryption submodule 1502, hashing submodule 1504, and comparator submodule 1506. The processor submodule 1508 configured to control operations in conjunction with decrypting, processing, and comparing one of more of the digital signature, unsecured video fingerprint, fresh hash value, and decrypted hash value. In another exemplary embodiment of the fingerprint verification module 1404, if the fresh hash value does not match the decrypted hash value, the comparator submodule 1506 is configured such that the unsecured video fingerprint is not verified.

In yet another exemplary embodiment of the fingerprint verification module 1404, in conjunction with using the hashing algorithm, the hashing submodule 1504 is configured to apply the hashing algorithm to an arrangement of data representing the unsecured video fingerprint to determine a checksum value establishing the fresh hash value.

Figure 16:
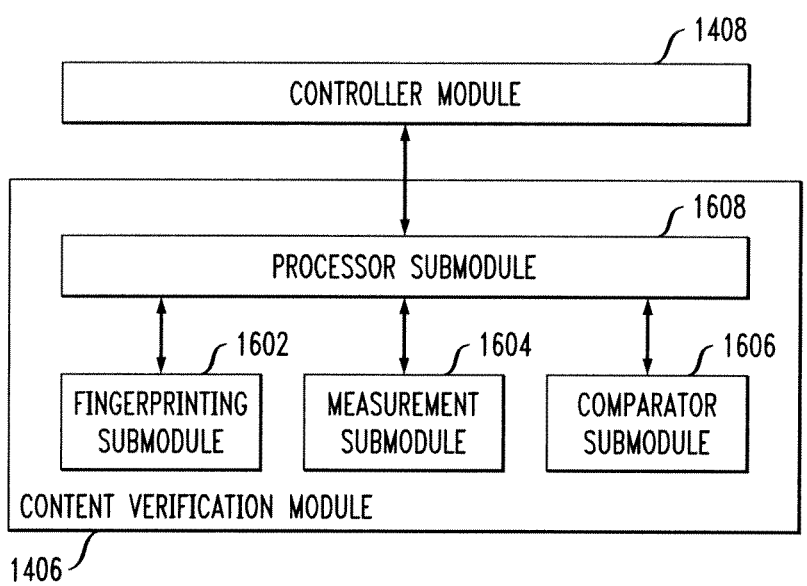
FIG. 16 is a block diagram of an exemplary embodiment of a content verification module associated with the receiving node of FIG. 14.

With reference to FIG. 16, an exemplary embodiment of the content verification module 1406 includes a fingerprinting submodule 1602, a measurement submodule 1604, a comparator submodule 1606, and a processor submodule 1608 for verifying the unsecured video content in conjunction with the controller module 1408. The fingerprinting submodule 1602 configured to generate a fresh video fingerprint by processing the unsecured video content using the fingerprinting algorithm. The measurement submodule 1604 configured to determine a distance metric between the unsecured video fingerprint and the fresh video fingerprint using a complexity-invariant distance measure algorithm. The comparator submodule 1606 configured to compare the distance metric to a predetermined threshold such that the unsecured video content is verified if the distance metric does not exceed the predetermined threshold. The processor submodule 1608 in operative communication with the fingerprinting submodule 1602, measurement submodule 1604, and comparator submodule 1606. The processor submodule 1608 configured to control operations in conjunction with generating, determining, and comparing one or more of the fresh video fingerprint, unsecured video content, distance metric, unsecured video fingerprint, and predetermined threshold. In another exemplary embodiment of the content verification module 1406, if the distance metric exceeds the predetermined threshold, the comparator submodule 1606 is configured such that the unsecured video content is not verified.

In yet another exemplary embodiment of the content verification module 1406, the fingerprinting submodule 1602 is configured to select a sample of video frames from the unsecured video content and arranging the sample video frames in a concatenated time sequence. The fingerprinting submodule 1602 also detects salient feature points in each sample video frame. The fingerprinting submodule 1602 is also configured to compute angular orientations of optical flow for each salient feature point in each sample video frame in relation to the corresponding salient feature point in the next sample video frame of the concatenated time sequence. Additionally, the fingerprinting submodule 1602 distributes the angular orientations for the salient feature points of each sample video frame into corresponding angular range bins for each sample video frame. The fingerprinting submodule 1602 also concatenates the values in each angular range bin for the sample video frames over the concatenated time sequence to form a histogram for each angular range bin. The fingerprinting submodule 1602 is also configured to normalize the set of histograms for the angular range bins to form a corresponding set of motion time series that establish the fresh video fingerprint.

In still another embodiment of the content verification module 1406, in conjunction with using the fingerprinting algorithm to establish the fresh video fingerprint, the fingerprinting submodule 1602 is configured to compress each motion time series using a linear segmentation algorithm to convert the corresponding histogram into a corresponding sequence of linear segments. The fingerprinting submodule 1602 also extracts major inclines from each compressed motion time series based at least in part on selecting linear segments that are greater than a predetermined threshold value for at least one of a time characteristic and an amplitude characteristic to form a corresponding set of motion time series for the fresh video fingerprint represented by the extracted major inclines.

In still yet another embodiment of the content verification module 1406, the original video fingerprint, unsecure video fingerprint, and fresh video fingerprint each comprise a corresponding set of motion time series formed by reducing corresponding histograms to sequences of linear segments and extracting major inclines from the sequences of linear segments. In this embodiment, in conjunction with using the complexity-invariant distance measure algorithm, the measurement submodule 1604 is configured to pair each motion time series of the unsecured video fingerprint with a corresponding motion time series of the fresh video fingerprint. The measurement submodule 1604 also aligns each paired motion time series based at least in part on identification of similar major inclines in the corresponding paired motion time series. The measurement submodule 1604 is also configured to determine a distance measure between each aligned motion time series using the complexity-invariant distance measure algorithm.

In still yet another embodiment of the content verification module 1406, the original video fingerprint, unsecure video fingerprint, and fresh video fingerprint each comprise a corresponding set of motion time series formed by corresponding histograms. In this embodiment, in conjunction with using the complexity-invariant distance measure algorithm, the measurement submodule 1604 is configured to compress each motion time series of the unsecure video fingerprint using a linear segmentation algorithm to convert the corresponding histogram into a corresponding sequence of linear segments. The measurement submodule 1604 also extracts major inclines from each compressed motion time series of the unsecure video fingerprint based at least in part on selecting linear segments that are greater than a predetermined threshold value for at least one of a time characteristic and an amplitude characteristic to form a corresponding set of motion time series for the unsecure video fingerprint represented by the extracted major inclines. The measurement submodule 1604 is also configured to compress each motion time series of the fresh video fingerprint using the linear segmentation algorithm to convert the corresponding histogram into a corresponding sequence of linear segments. Additionally, the measurement submodule 1604 extracts major inclines from each compressed motion time series of the fresh video fingerprint based at least in part on selecting linear segments that are greater than the predetermined threshold value for at least one of the time characteristic and the amplitude characteristic to form a corresponding set of motion time series for the fresh video fingerprint represented by the extracted major inclines. The measurement submodule 1604 also pairs each motion time series of the unsecured video fingerprint with a corresponding motion time series of the fresh video fingerprint. The measurement submodule 1604 is also configured to align each paired motion time series based at least in part on identification of similar major inclines in the corresponding paired motion time series. Additionally, the measurement submodule 1604 determines a distance measure between each aligned motion time series using the complexity-invariant distance measure algorithm.

Figure 17:
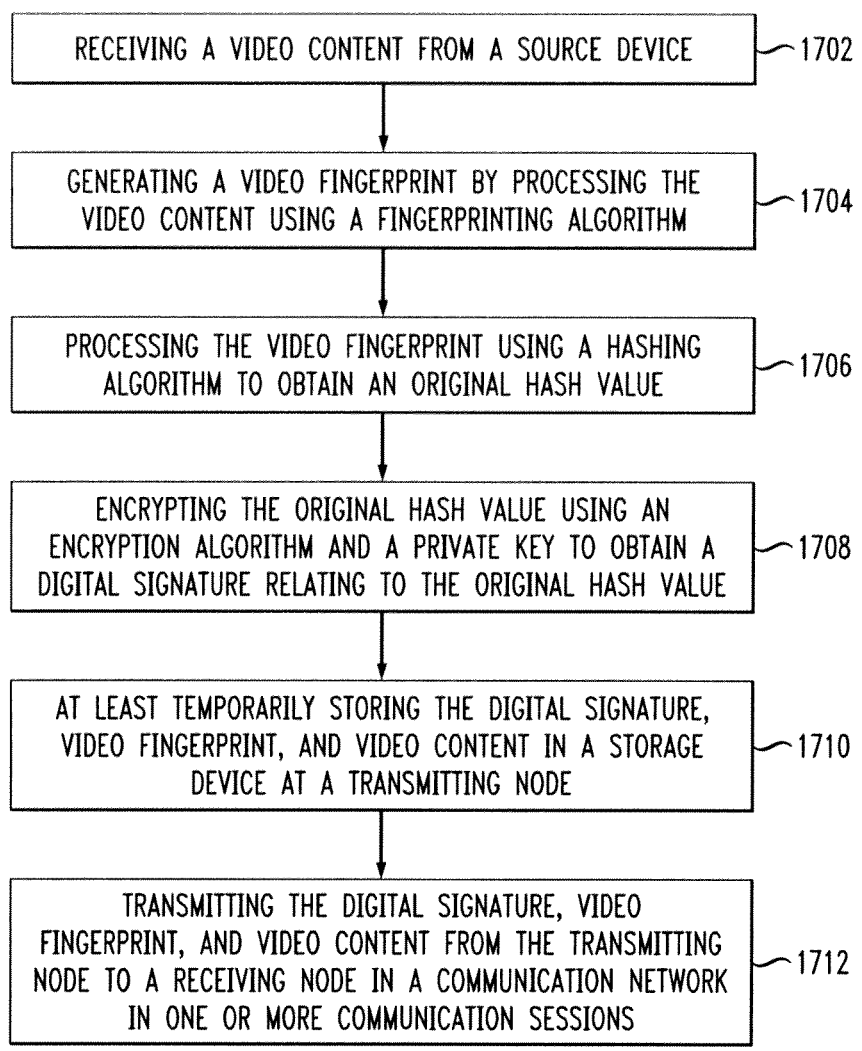
FIG. 17 is a flow chart of another exemplary embodiment of a process for authenticating video content.

With reference to FIG. 17, another exemplary embodiment of a process 1700 for authenticating video content begins at 1702 where a video content is received from a source device. Next, a video fingerprint is generated by processing the video content using a fingerprinting algorithm (1704). At 1706, the video fingerprint is processed using a hashing algorithm to obtain an original hash value. Next, the original hash value is encrypted using an encryption algorithm and a private key to obtain a digital signature relating to the original hash value (1708). At 1710, the digital signature, video fingerprint, and video content are at least temporarily stored in a storage device at a transmitting node. Next, the digital signature, video fingerprint, and video content are transmitted from the transmitting node to a receiving node in a communication network in one or more communication sessions (1712).

In another embodiment, in conjunction with using the hashing algorithm, the process 1700 also includes applying the hashing algorithm to an arrangement of data representing the video fingerprint to determine a checksum value establishing the original hash value.

In yet another embodiment of the process 1700, the receiving node, after receiving the digital signature, video fingerprint, and video content from the transmitting node, is able to determine if the decrypted hash value is consistent with the received video fingerprint to verify the received video fingerprint. In this embodiment, the receiving node is also able to determine if the received video fingerprint is consistent with the received video content to verify the received video content in a manner that tolerates a predetermined measure of loss in the received video content. In a further embodiment, if the received video fingerprint and the received video content are verified by the receiving node, the received video content is authenticated for subsequent use at the receiving node. In another further embodiment, if the received video fingerprint is not verified by the receiving node, the received video content is not authenticated for subsequent use at the receiving node. In yet another further embodiment, if the received video fingerprint is verified and the received video content is not verified by the receiving node, the received video content is not authenticated for subsequent use at the receiving node.

In still another embodiment of the process 1700, the digital signature and the video content are transmitted to the receiving node in separate communication sessions via different communication paths. In still yet another embodiment of the process 1700, the video fingerprint and the video content are transmitted to the receiving node in separate communication sessions via different communication paths.

In another embodiment of the process 1700, the digital signature is prepended, embedded, or appended with the video content for transmission to the receiving node. In yet another embodiment of the process 1700, the video fingerprint is prepended, embedded, or appended with the video content for transmission to the receiving node.

Figure 18:
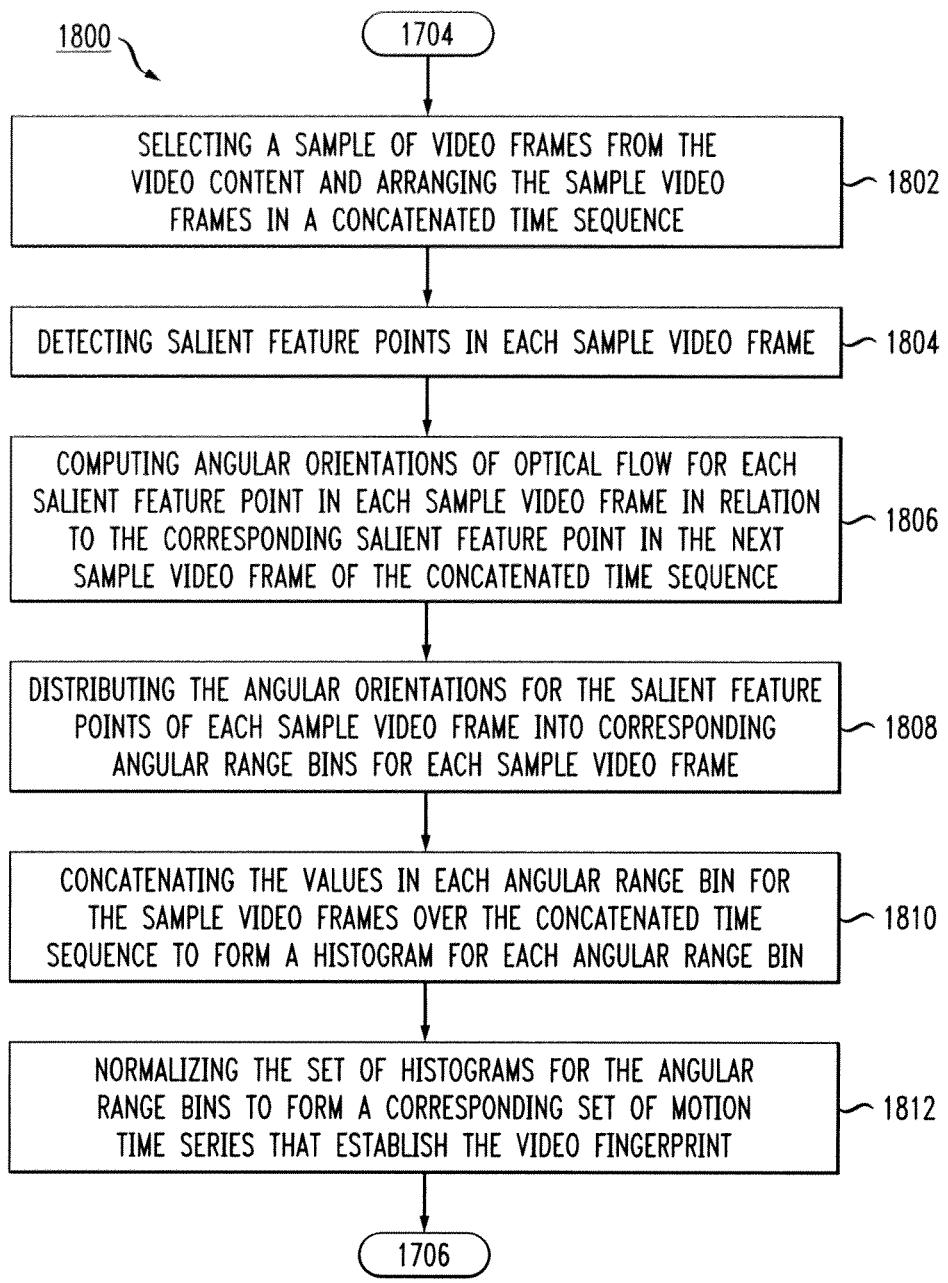
FIG. 18, in combination with FIG. 17, is a flow chart of yet another exemplary embodiment of a process for authenticating video content.

With reference to FIGS. 17 and 18, another exemplary embodiment of a process 1800 for authenticating video extends the process 1700 of FIG. 17 in conjunction with using the fingerprinting algorithm (1704). In this embodiment, the process 1800 advances from 1704 of FIG. 17 to 1802 where a sample of video frames is selected from the video content and arranged in a concatenated time sequence. Next, salient feature points in each sample video frame (1804). At 1806, angular orientations of optical flow are computed for each salient feature point in each sample video frame in relation to the corresponding salient feature point in the next sample video frame of the concatenated time sequence. Next, the angular orientations for the salient feature points of each sample video frame are distributed into corresponding angular range bins for each sample video frame (1808). At 1810, the values in each angular range bin for the sample video frames are concatenated over the concatenated time sequence to form a histogram for each angular range bin. Next, the set of histograms for the angular range bins are normalized to form a corresponding set of motion time series that establish the video fingerprint (1812). In this embodiment, the process 1800 returns to 1706 after 1812.

In another embodiment, in conjunction with using the fingerprinting algorithm to establish the video fingerprint, the process 1800 also includes compressing each motion time series using a linear segmentation algorithm to convert the corresponding histogram into a corresponding sequence of linear segments. In this embodiment, major inclines are extracted from each compressed motion time series based at least in part on selecting linear segments that are greater than a predetermined threshold value for at least one of a time characteristic and an amplitude characteristic to form a corresponding set of motion time series for the video fingerprint represented by the extracted major inclines.

Figure 19:
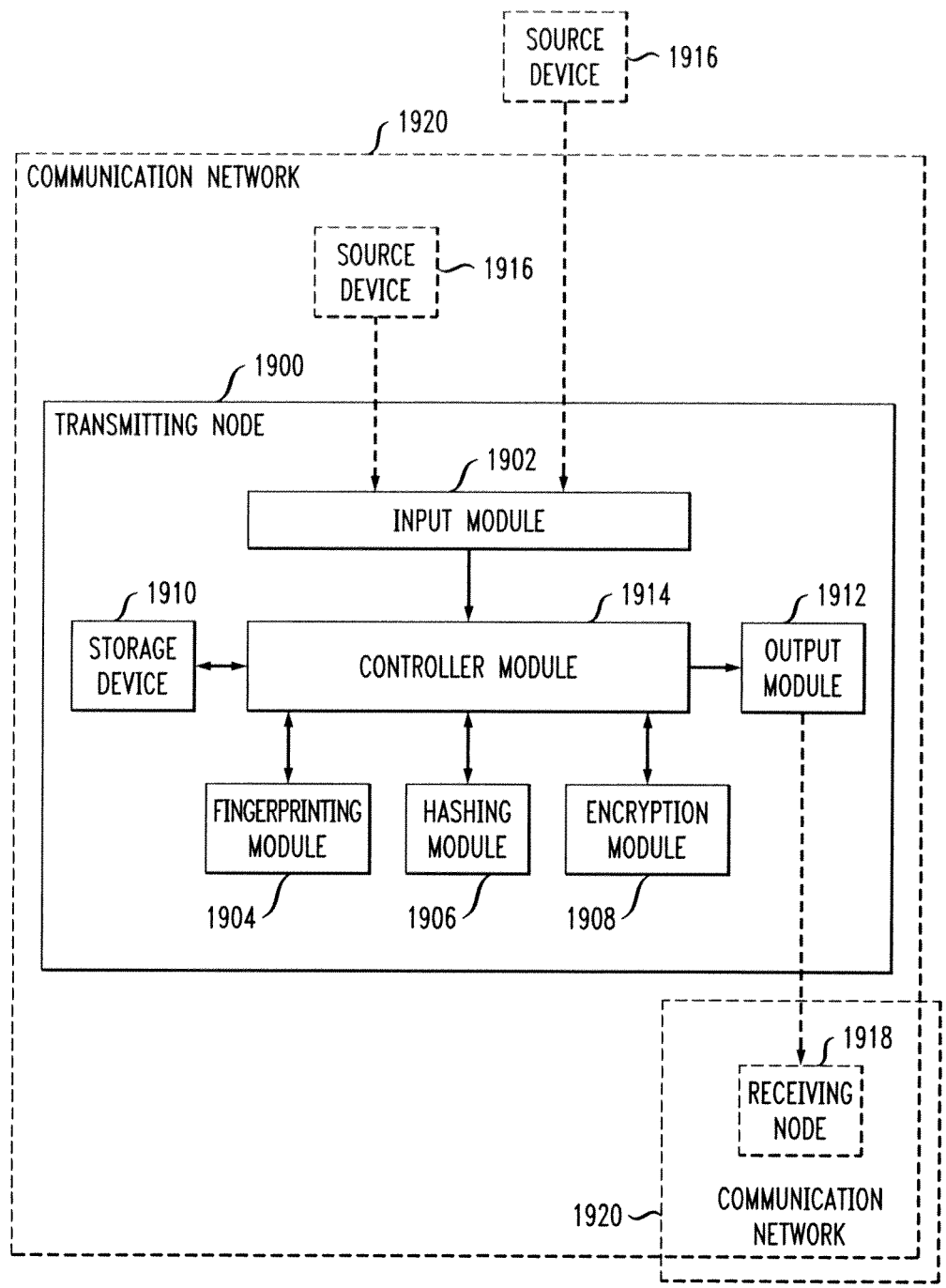
FIG. 19 is a block diagram of an exemplary embodiment of a transmitting node for authenticating video content.

With reference to FIG. 19, an exemplary embodiment of a transmitting node 1900 for authenticating video content includes an input module 1902, a fingerprinting module 1904, a hashing module 1906, an encryption module 1908, a storage device 1910, an output module 1912, and a controller module 1914. The input module 1902 configured to receive a video content from a source device 1916. The fingerprinting module 1904 configured to generate a video fingerprint by processing the video content using a fingerprinting algorithm. The hashing module 1906 configured to process the video fingerprint using a hashing algorithm to obtain an original hash value. The encryption module 1908 configured to encrypt the original hash value using an encryption algorithm and a private key to obtain a digital signature relating to the original hash value. The storage device 1910 configured to at least temporarily store the digital signature, video fingerprint, and video content. The output module 1912 configured to transmit the digital signature, video fingerprint, and video content to a receiving node 1918 in a communication network 1920 in one or more communication sessions. The controller module 1914 in operative communication with the input module 1902, fingerprinting module 1904, hashing module 1906, encryption module 1908, storage device 1910, and output module 1912 and configured to control operations in conjunction with receiving, generating, processing, encrypting, storing, and transmitting one or more of the video content, video fingerprint, and digital signature.

The transmitting node 1900 may be a network node in the communication network 1920 or a user or computing device with access to the communication network 1920. Similarly, the source device 1916 may be a network node in the communication network 1920 or a user or computing device with access to the communication network 1920. For example, the source device 1916 may include a video capture device (e.g., video camera), a video storage device (e.g., video content server), or both. The transmitting node 1900 and source device 1916 may be at different locations, co-located (e.g., security system), or combined in same device (e.g., mobile station, laptop computer, etc.).

In another embodiment of the transmitting node 1900, in conjunction with using the hashing algorithm, the hashing module 1906 is configured to apply the hashing algorithm to an arrangement of data representing the video fingerprint to determine a checksum value establishing the original hash value.

In yet another embodiment of the transmitting node 1900, the receiving node 1918, after receiving the digital signature, video fingerprint, and video content from the transmitting node 1900, is able to determine if the decrypted hash value is consistent with the received video fingerprint to verify the received video fingerprint. In this embodiment, the receiving node 1918 is also able to determine if the received video fingerprint is consistent with the received video content to verify the received video content in a manner that tolerates a predetermined measure of loss in the received video content. In a further embodiment, if the received video fingerprint and the received video content are verified by the receiving node, the received video content is authenticated for subsequent use at the receiving node 1918. In another further embodiment, if the received video fingerprint is not verified by the receiving node, the received video content is not authenticated for subsequent use at the receiving node 1918. In yet another further embodiment, if the received video fingerprint is verified and the received video content is not verified by the receiving node, the received video content is not authenticated for subsequent use at the receiving node 1918.

In still another embodiment of the transmitting node 1900, the digital signature and the video content are transmitted to the receiving node in separate communication sessions via different communication paths. In still yet another embodiment of the transmitting node 1900, the video fingerprint and the video content are transmitted to the receiving node in separate communication sessions via different communication paths.

In another embodiment of the transmitting node 1900, the digital signature is prepended, embedded, or appended with the video content for transmission to the receiving node. In yet another embodiment of the transmitting node 1900, the video fingerprint is prepended, embedded, or appended with the video content for transmission to the receiving node.

In still another embodiment of the transmitting node 1900, in conjunction with using the fingerprinting algorithm, the fingerprinting module 1904 is configured to select a sample of video frames from the video content and arranging the sample video frames in a concatenated time sequence. The fingerprinting module 1904 also detects salient feature points in each sample video frame. The fingerprinting module 1904 is also configured to compute angular orientations of optical flow for each salient feature point in each sample video frame in relation to the corresponding salient feature point in the next sample video frame of the concatenated time sequence. Additionally, the fingerprinting module 1904 distributes the angular orientations for the salient feature points of each sample video frame into corresponding angular range bins for each sample video frame. The fingerprinting module 1904 also concatenates the values in each angular range bin for the sample video frames over the concatenated time sequence to form a histogram for each angular range bin. The fingerprinting module 1904 is also configured to normalize the set of histograms for the angular range bins to form a corresponding set of motion time series that establish the video fingerprint.

In a further embodiment of the transmitting node 1900, in conjunction with using the fingerprinting algorithm to establish the video fingerprint, the fingerprinting module 1904 is configured to compress each motion time series using a linear segmentation algorithm to convert the corresponding histogram into a corresponding sequence of linear segments. In this embodiment, the fingerprinting module 1904 also extracts major inclines from each compressed motion time series based at least in part on selecting linear segments that are greater than a predetermined threshold value for at least one of a time characteristic and an amplitude characteristic to form a corresponding set of motion time series for the video fingerprint represented by the extracted major inclines.

With reference again to FIGS. 9-16, an exemplary embodiment of a non-transitory computer-readable medium storing first program instructions that, when executed by a first computer, cause a computer-controlled receiving node 1400 to perform a process (e.g., 900, 1000, 1100, 1200, 1300) for authenticating video content. In one exemplary embodiment, the process includes, after receiving a digital signature, an unsecured video fingerprint, and an unsecured video content from a transmitting node at a receiving node in a communication network, determining if the decrypted hash value is consistent with the unsecured video fingerprint at the receiving node to verify the unsecured video fingerprint. The process also determines if the unsecured video fingerprint is consistent with the unsecured video content at the receiving node to verify the unsecured video content in a manner that tolerates a predetermined measure of loss in the unsecured video content. If the unsecured video fingerprint and the unsecured video content are verified, the unsecured video content is authenticated for subsequent use at the receiving node.

In various additional embodiments, the first instructions stored in the non-transitory computer-readable memory, when executed by the first computer, may cause the computer-controlled receiving node 1400 to perform various combinations of functions associated with the processes 900, 1100, 1200, 1300 for authenticating video content described above. In other words, the various features described above may be implemented in any suitable combination by the first program instructions stored in the non-transitory computer-readable medium. Any suitable module or submodule of the receiving node 1400 described above may include the corresponding computer and non-transitory computer-readable medium associated with the corresponding program instructions. Alternatively, the corresponding computer and non-transitory computer-readable medium associated with the corresponding program instructions may be individual or combined components that are in operative communication with any suitable combination of the modules or submodules of the receiving node 1400 described above.

With reference again to FIGS. 17-19, an exemplary embodiment of a non-transitory computer-readable medium storing second program instructions that, when executed by a second computer, cause a computer-controlled transmitting node 1900 to perform a process (e.g., 1700, 1800) for authenticating video content. In one exemplary embodiment, the process includes, after receiving a video content from a source device, generating a video fingerprint by processing the video content using a fingerprinting algorithm. The video fingerprint is processed using a hashing algorithm to obtain an original hash value. The original hash value is encrypted using an encryption algorithm and a private key to obtain a digital signature relating to the original hash value. The digital signature, video fingerprint, and video content are at least temporarily stored in a storage device at a transmitting node. The digital signature, video fingerprint, and video content are transmitted from the transmitting node to a receiving node in a communication network in one or more communication sessions.

In various additional embodiments, the first instructions stored in the non-transitory computer-readable memory, when executed by the first computer, may cause the computer-controlled transmitting node 1900 to perform various combinations of functions associated with the processes 1700, 1800 for authenticating video content described above. In other words, the various features described above may be implemented in any suitable combination by the first program instructions stored in the non-transitory computer-readable medium. Any suitable module of the transmitting node 1900 described above may include the corresponding computer and non-transitory computer-readable medium associated with the corresponding program instructions. Alternatively, the corresponding computer and non-transitory computer-readable medium associated with the corresponding program instructions may be individual or combined components that are in operative communication with any suitable combination of the modules of the transmitting node 1900 described above.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for authenticating video content, comprising:
   receiving a digital signature, a received video fingerprint, and a video content from a transmitting node at a receiving node in a communication network, wherein the received video fingerprint is a received version of an original video fingerprint that is derived from an original video content using a fingerprinting algorithm that derives said original video fingerprint based on trajectories of movement of salient feature points detected from sampled frames of the original video content prior to transmission of the original video fingerprint by the transmitting node;
   verifying the received video fingerprint by determining if the digital signature is consistent with the received video fingerprint at the receiving node; and
   verifying the video content by determining if the received video fingerprint is consistent with the video content at the receiving node in a manner that tolerates a predetermined measure of loss in the video content, wherein the verifying the video content includes generating a fresh video fingerprint by processing the video content at the receiving node using the fingerprinting algorithm;
   wherein, if the received video fingerprint and the video content are verified, the video content is authenticated for subsequent use at the receiving node.

2. The method of claim 1 wherein the manner that tolerates a predetermined measure of loss in the video content is based on a distance metric between the received video fingerprint and the fresh video fingerprint at the receiving node using a complexity-invariant distance measure algorithm.

3. The method of claim 1 wherein the digital signature is produced from an original hash value using an encryption algorithm and a private key prior to transmission of the digital signature by the transmitting node;
   wherein the original hash value is derived from the original video fingerprint using a hashing algorithm prior to encryption of the original hash value.

4. The method of claim 3, in conjunction with verifying the received video fingerprint, the method further comprising:
   decrypting the digital signature using a decryption algorithm and a public key at the receiving node to obtain a decrypted hash value relating to the original hash value;
   processing the received video fingerprint using the hashing algorithm at the receiving node to obtain a fresh hash value relating to the original hash value; and
   comparing the fresh hash value to the decrypted hash value at the receiving node such that the received video fingerprint is verified if the fresh hash value matches the decrypted hash value.

5. The method of claim 1, in conjunction with verifying the video content, the method further comprising:
   generating the fresh video fingerprint by processing the video content at the receiving node using the fingerprinting algorithm;
   determining a distance metric between the received video fingerprint and the fresh video fingerprint at the receiving node using a complexity-invariant distance measure algorithm; and
   comparing the distance metric to a predetermined threshold at the receiving node such that the video content is verified if the distance metric does not exceed the predetermined threshold.

6. The method of claim 5, in conjunction with using the fingerprinting algorithm, the method further comprising:
   selecting the sample of video frames from the video content and arranging the sample video frames in a concatenated time sequence;
   detecting the salient feature points in each sample video frame;
   computing angular orientations of optical flow for each salient feature point in each sample video frame in relation to the corresponding salient feature point in the next sample video frame of the concatenated time sequence;
   distributing the angular orientations for the salient feature points of each sample video frame into corresponding angular range bins for each sample video frame;
   concatenating the values in each angular range bin for the sample video frames over the concatenated time sequence to form a histogram for each angular range bin; and
   normalizing the set of histograms for the angular range bins to form a corresponding set of motion time series that establish the fresh video fingerprint.

7. The method of claim 6, in conjunction with using the fingerprinting algorithm to establish the fresh video fingerprint, the method further comprising:
   compressing each motion time series using a linear segmentation algorithm to convert the corresponding histogram into a corresponding sequence of linear segments; and
   extracting major inclines from each compressed motion time series based at least in part on selecting linear segments that are greater than a predetermined threshold value for at least one of a time characteristic and an amplitude characteristic to form a corresponding set of motion time series for the fresh video fingerprint represented by the extracted major inclines.

8. The method of claim 5 wherein the original video fingerprint, the received video fingerprint, and fresh video fingerprint each comprise a corresponding set of motion time series formed by reducing corresponding histograms to sequences of linear segments and extracting major inclines from the sequences of linear segments.

9. The method of claim 8, in conjunction with using the complexity-invariant distance measure algorithm, the method further comprising:

pairing each motion time series of the received video fingerprint with a corresponding motion time series of the fresh video fingerprint;
aligning each paired motion time series based at least in part on identification of similar major inclines in the corresponding paired motion time series; and
determining a distance measure between each aligned motion time series using the complexity-invariant distance measure algorithm.

10. The method of claim 5 wherein the original video fingerprint, the received video fingerprint, and the fresh video fingerprint each comprise a corresponding set of motion time series formed by corresponding histograms.

11. The method of claim 10, in conjunction with using the complexity-invariant distance measure algorithm, the method further comprising:
compressing each motion time series of the received video fingerprint using a linear segmentation algorithm to convert the corresponding histogram into a corresponding sequence of linear segments;
extracting major inclines from each compressed motion time series of the received video fingerprint based at least in part on selecting linear segments that are greater than a predetermined threshold value for at least one of a time characteristic and an amplitude characteristic to form a corresponding set of motion time series for the received video fingerprint represented by the extracted major inclines;
compressing each motion time series of the fresh video fingerprint using the linear segmentation algorithm to convert the corresponding histogram into a corresponding sequence of linear segments;
extracting major inclines from each compressed motion time series of the fresh video fingerprint based at least in part on selecting linear segments that are greater than the predetermined threshold value for at least one of the time characteristic and the amplitude characteristic to form a corresponding set of motion time series for the fresh video fingerprint represented by the extracted major inclines;
pairing each motion time series of the received video fingerprint with a corresponding motion time series of the fresh video fingerprint;
aligning each paired motion time series based at least in part on identification of similar major inclines in the corresponding paired motion time series; and
determining a distance measure between each aligned motion time series using the complexity-invariant distance measure algorithm.

12. An apparatus for authenticating video content, comprising:
an input module configured to receive a digital signature, a received video fingerprint, and video content from a transmitting node via a communication network, wherein the received video fingerprint is a received version of an original video fingerprint that is derived from an original video content using a fingerprinting algorithm that derives said original video fingerprint based on trajectories of movement of salient feature points detected from sampled frames of the original video content prior to transmission of the original video fingerprint by the transmitting node;
a fingerprint verification module configured to verify the received video fingerprint by determining if the digital signature is consistent with the received video fingerprint;
a content verification module configured to verify the video content by determining if the received video fingerprint is consistent with the video content in a manner that tolerates a predetermined measure of loss in the video content, wherein verifying the video content includes generating a fresh video fingerprint by processing the video content at the apparatus using the fingerprinting algorithm; and
a controller module in operative communication with the input module, fingerprint verification module, and content verification module and configured to control operations such that, if the received video fingerprint and the video content are verified, the video content is authenticated for subsequent use.

13. The apparatus of claim 12 wherein the digital signature is produced from an original hash value using an encryption algorithm and a private key prior to transmission of the digital signature by the transmitting node;
wherein the original hash value is derived from the original video fingerprint using a hashing algorithm prior to encryption of the original hash value;
wherein, in conjunction with verifying the received video fingerprint, the fingerprint verification module comprises:
a decryption submodule configured to decrypt the digital signature using a decryption algorithm and a public key to obtain a decrypted hash value relating to the original hash value;
a hashing submodule configured to process the received video fingerprint using the hashing algorithm to obtain a fresh hash value relating to the original hash value;
a comparator submodule configured to compare the fresh hash value to the decrypted hash value such that the received video fingerprint is verified if the fresh hash value matches the decrypted hash value; and
a processor submodule in operative communication with the decryption submodule, hashing submodule, and comparator submodule and configured to control operations in conjunction with decrypting, processing, and comparing one or more of the digital signature, received video fingerprint, fresh hash value, and decrypted digital signature.

14. The apparatus of claim 12 wherein, in conjunction with verifying the video content, the content verification module comprises:
a fingerprinting submodule configured to generate the fresh video fingerprint by processing the video content using the fingerprinting algorithm;
a measurement submodule configured to determine a distance metric between the received video fingerprint and the fresh video fingerprint using a complexity-invariant distance measure algorithm;
a comparator submodule configured to compare the distance metric to a predetermined threshold such that the video content is verified if the distance metric does not exceed the predetermined threshold; and
a processor submodule in operative communication with the fingerprinting submodule, measurement submodule, and comparator submodule and configured to control operations in conjunction with generating, determining, and comparing one or more of the fresh video fingerprint, video content, distance metric, received video fingerprint, and predetermined threshold.

15. A method for authenticating video content, comprising:
receiving a video content from a source device;
generating a video fingerprint by processing the video content using a fingerprinting algorithm;

processing the video fingerprint using a hashing algorithm to obtain an original hash value;

encrypting the original hash value using an encryption algorithm and a private key to obtain a digital signature relating to the original hash value;

at least temporarily storing the digital signature, video fingerprint, and video content in a storage device at a transmitting node; and transmitting the digital signature, video fingerprint, and video content from the transmitting node to a receiving node in a communication network in one or more communication sessions, wherein in conjunction with using the fingerprinting algorithm, the method further includes:

selecting a sample of video frames from the video content and arranging the sample video frames in a concatenated time sequence;

detecting salient feature points in each sample video frame;

computing angular orientations of optical flow for each salient feature point in each sample video frame in relation to the corresponding salient feature point in the next sample video frame of the concatenated time sequence;

distributing the angular orientations for the salient feature points of each sample video frame into corresponding angular range bins for each sample video frame;

concatenating the values in each angular range bin for the sample video frames over the concatenated time sequence to form a histogram for each angular range bin; and normalizing the set of histograms for the angular range bins to form a corresponding set of motion time series that establish the video fingerprint.

16. The method of claim 15 wherein the receiving node, after receiving the digital signature, video fingerprint, and video content from the transmitting node, is able to determine if the decrypted hash value is consistent with the received video fingerprint to verify the received video fingerprint and to determine if the received video fingerprint is consistent with the received video content to verify the received video content in a manner that tolerates a predetermined measure of loss in the received video content.

17. The method of claim 15, in conjunction with using the fingerprinting algorithm to establish the video fingerprint, the method further comprising:

compressing each motion time series using a linear segmentation algorithm to convert the corresponding histogram into a corresponding sequence of linear segments; and extracting major inclines from each compressed motion time series based at least in part on selecting linear segments that are greater than a predetermined threshold value for at least one of a time characteristic and an amplitude characteristic to form a corresponding set of motion time series for the video fingerprint represented by the extracted major inclines.

18. A non-transitory computer-readable medium storing first program instructions that, when executed by a first computer, cause a computer-controlled receiving node associated with a communication network to perform a method for authenticating video content, the method comprising:

after receiving a digital signature, a received video fingerprint, and a video content from a transmitting node at a receiving node in a communication network, verifying the received video fingerprint by determining if the digital signature is consistent with the received video fingerprint at the receiving node, wherein the received video fingerprint is a received version of an original video fingerprint that is derived from an original video content using a fingerprinting algorithm that derives said original video fingerprint based on trajectories of movement of salient feature points detected from sampled frames of the original video content prior to transmission of the original video fingerprint by the transmitting node; and verifying the video content by determining if the received video fingerprint is consistent with the video content at the receiving node in a manner that tolerates a predetermined measure of loss in the video content, wherein the verifying the video content includes generating a fresh video fingerprint by processing the video content at the receiving node using the fingerprinting algorithm;

wherein, if the received video fingerprint and the video content are verified, the video content is authenticated for subsequent use at the receiving node.

19. The non-transitory computer-readable medium of claim 18 storing second program instructions that, when executed by a second computer, cause a computer-controlled transmitting node associated with the communication network to perform another method for authenticating video content, the other method comprising:

after receiving a video content from a source device, generating a video fingerprint by processing the video content using the fingerprinting algorithm;

processing the video fingerprint using a hashing algorithm to obtain an original hash value;

encrypting the original hash value using an encryption algorithm and a private key to obtain a digital signature relating to the original hash value;

at least temporarily storing the digital signature, video fingerprint, and video content in a storage device at a transmitting node; and transmitting the digital signature, video fingerprint, and video content from the transmitting node to a receiving node in a communication network in one or more communication sessions.

20. The method of claim 1 wherein the determining if the digital signature is consistent with the video fingerprint includes comparing a decrypted value from the digital signature to a calculated value from the video fingerprint and the determining if the video fingerprint is consistent with the video content includes comparing an extracted value from the video content to the video fingerprint.

21. The method as recited in claim 1 wherein the video fingerprint is unencrypted and the video content is an unencrypted.

* * * * *